(12) United States Patent
Sakuragi

(10) Patent No.: US 10,970,015 B2
(45) Date of Patent: Apr. 6, 2021

(54) IMAGE PROCESSING APPARATUS, METHOD, AND COMPUTER-READABLE MEDIUM FOR REDUCING TIME REQUIRED UNTIL COMPLETING OUTPUT PROCESS AFTER SUCCESSFUL AUTHENTICATION

(71) Applicant: BROTHER KOGYO KABUSHIKI KAISHA, Nagoya (JP)

(72) Inventor: Yuichiro Sakuragi, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/448,382

(22) Filed: Jun. 21, 2019

(65) Prior Publication Data

US 2019/0391770 A1 Dec. 26, 2019

(30) Foreign Application Priority Data

Jun. 26, 2018 (JP) .............................. JP2018-120506

(51) Int. Cl.
*G06F 3/12* (2006.01)
*H04N 1/44* (2006.01)

(52) U.S. Cl.
CPC ............ *G06F 3/1238* (2013.01); *G06F 3/122* (2013.01); *G06F 3/1222* (2013.01); *G06F 3/1239* (2013.01); *G06F 3/1254* (2013.01); *H04N 1/4413* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 2004/0213615 A1* | 10/2004 | Nakao | G06F 21/608 400/76 |
| 2009/0268227 A1* | 10/2009 | Kaneko | G06F 3/1222 358/1.14 |
| 2014/0233053 A1* | 8/2014 | Kakutani | G06F 3/1285 358/1.14 |
| 2016/0378416 A1* | 12/2016 | Tachi | H04N 1/00411 358/1.15 |

FOREIGN PATENT DOCUMENTS

| | | |
|---|---|---|
| JP | H10-336409 A | 12/1998 |
| JP | 2014-159123 A | 9/2014 |

* cited by examiner

*Primary Examiner* — Henok Shiferaw
(74) *Attorney, Agent, or Firm* — Scully Scott Murphy and Presser

(57) ABSTRACT

An image processing apparatus includes a print engine, a communication interface, a memory, and a controller configured to receive a print job via the communication interface, acquire authentication information associated with the print job, perform authentication based on the acquired authentication information, and determine whether the authentication is successful, when determining that the authentication is successful, cause the print engine to print, on a sheet, an image based on the print job, and regardless of whether the authentication is successful, transmit predetermined image data based on the print job via the communication interface.

20 Claims, 12 Drawing Sheets

FIG. 2

AUTHENTICATION DB

| | | 114 MULTI-OUTPUT EXECUTION SETTINGS | | | |
|---|---|---|---|---|---|
| 111 USER NAME | 113 PASSWORD | PRINTING PROCESS | FAX TRANSMISSION PROCESS | SERVER STORING PROCESS | MAIL TRANSMISSION PROCESS |
| inoue | 1111 | ○ | ○ | ○ | × |
| kato | 2222 | ○ | ○ | ○ | × |
| hayashi | 3333 | ○ | × | × | ○ |
| minami | 4444 | × | × | ○ | ○ |

IMAGE PROCESSING APPARATUS, METHOD, AND COMPUTER-READABLE MEDIUM FOR REDUCING TIME REQUIRED UNTIL COMPLETING OUTPUT PROCESS AFTER SUCCESSFUL AUTHENTICATION

CROSS-REFERENCE TO RELATED APPLICATION

This application claims priority under 35 U.S.C. § 119 from Japanese Patent Application No. 2018-120506 filed on Jun. 26, 2018. The entire subject matter of the application is incorporated herein by reference.

BACKGROUND

Technical Field

Aspects of the present disclosure are related to an image processing apparatus, a method, and a non-transitory computer-readable medium for reducing a period of time required until completing one or more output processes after successful authentication.

Related Art

Heretofore, an image processing apparatus has been proposed that is configured to, when receiving print data with a password set therefor, store the received print data without performing image forming based on the print data immediately after receipt of the print data. The proposed apparatus may perform authentication based on the set password and perform image forming based on the stored print data after successful authentication.

SUMMARY

In the meantime, an image processing apparatus has been known that is configured to perform a plurality of output processes such as a printing process and a fax transmission process. In this case, the known apparatus may perform the plurality of output processes based on a single piece of print data. Nonetheless, if the known apparatus performs all the plurality of output processes in response to successful authentication, a large processing load is intensively imposed on the known apparatus, and it might cause a problem that it takes a long period of time to complete all the plurality of output processes.

Aspects of the present disclosure are advantageous to provide one or more improved techniques that make it possible to shorten a period of time required until an image processing apparatus completes one or more output processes after successful authentication.

According to aspects of the present disclosure, an image processing apparatus is provided, which includes a print engine, a communication interface, a memory, and a controller. The controller is configured to receive a print job via the communication interface, acquire authentication information associated with the print job, perform authentication based on the acquired authentication information, and determine whether the authentication is successful, when determining that the authentication is successful, cause the print engine to print an image on a sheet based on the print job, and regardless of whether the authentication is successful, transmit particular image data based on the print job via the communication interface.

According to aspects of the present disclosure, further provided is a method implementable on a processor coupled with an image processing apparatus including a print engine, a communication interface, and a memory. The method includes receiving a print job via the communication interface, acquiring authentication information associated with the print job, performing authentication based on the acquired authentication information, and determining whether the authentication is successful, when determining that the authentication is successful, causing the print engine to print an image on a sheet based on the print job, and regardless of whether the authentication is successful, transmitting particular image data based on the print job via the communication interface.

According to aspects of the present disclosure, further provided is a non-transitory computer-readable medium storing computer-readable instructions that are executable by a processor coupled with an image processing apparatus including a print engine, a communication interface, and a memory. The instructions are configured to, when executed by the processor, cause the image processing apparatus to receive a print job via the communication interface, acquire authentication information associated with the print job, perform authentication based on the acquired authentication information, and determine whether the authentication is successful, when determining that the authentication is successful, cause the print engine to print an image on a sheet based on the print job, and regardless of whether the authentication is successful, transmit particular image data based on the print job via the communication interface.

BRIEF DESCRIPTION OF THE ACCOMPANYING DRAWINGS

FIG. 1 is a block diagram schematically showing a configuration of an image forming system including an MFP ("MFP" is an abbreviation of "Multi-Function Peripheral"), PCs, a file server, and a mail server, in an illustrative embodiment according to one or more aspects of the present disclosure.

FIG. 2 exemplifies data registered on an authentication DB ("DB" is an abbreviation of "database"), in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
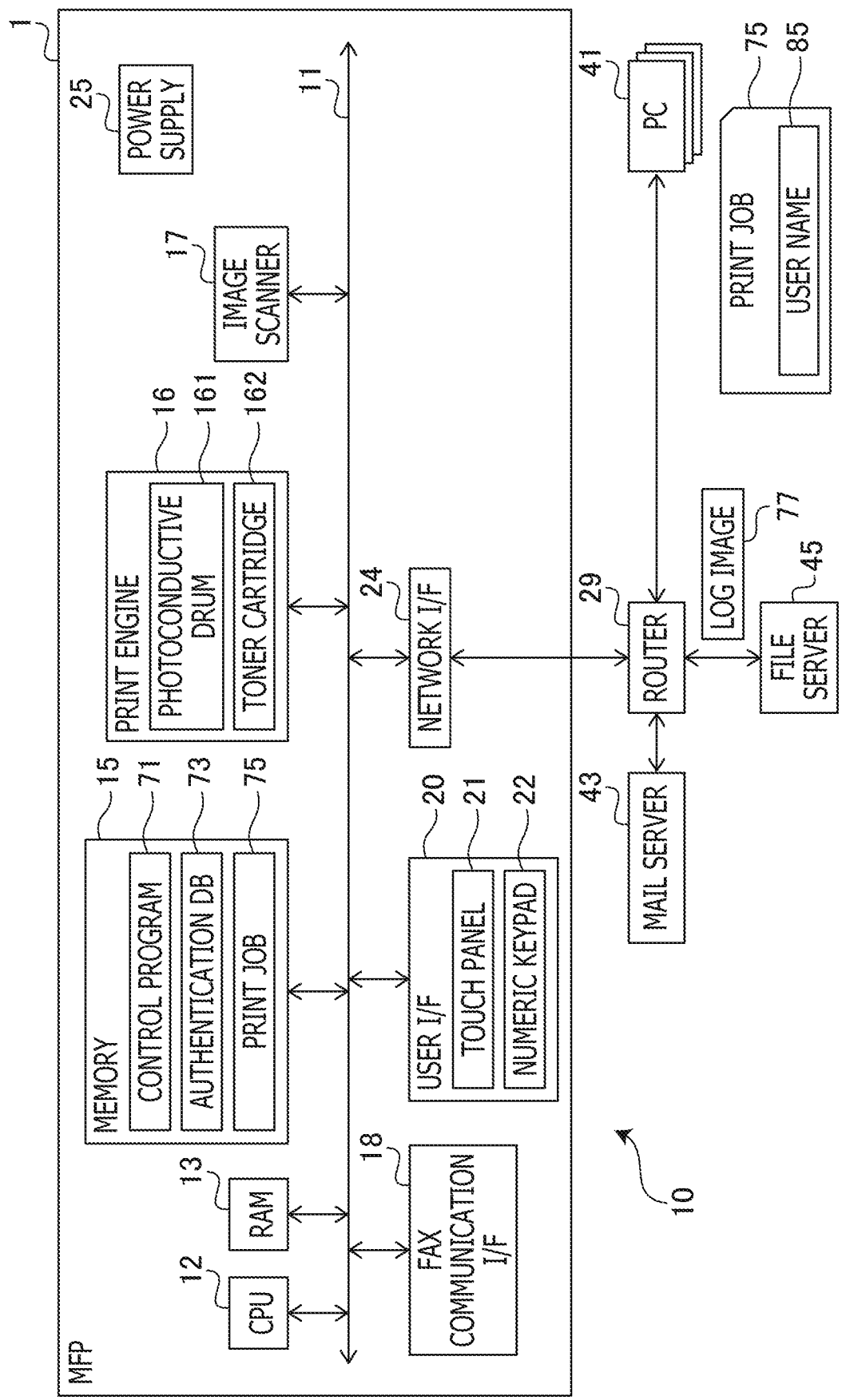

Hereinafter, an illustrative embodiment according to aspects of the present disclosure will be described with reference to the accompanying drawings. FIG. 1 is a block diagram schematically showing a configuration of an image forming system 10. As shown in FIG. 1, the image forming system 10 includes an MFP ("MFP" is an abbreviation of "Multi-Function Peripheral") 1, a router 29, a plurality of PCs 41, a mail server 43, and a file server 45.

1. Configuration of MFP

The MFP 1 has a plurality of functions such as a printing function, a copy function, a scanning function, and a facsimile function. As shown in FIG. 1, the MFP 1 includes a CPU 12, a RAM 13, a memory 15, a print engine 16, an image scanner 17, a fax communication I/F ("I/F" is an abbreviation of "interface") 18, a user I/F 20, and a network I/F 24. The aforementioned elements included in the MFP 1 are interconnected via a bus 11. It is noted that the print engine 16 may be controlled directly by the CPU 12 or indirectly by the CPU 12 via an engine control circuit (not shown) as an engine interface. Further, the MFP 1 includes a power supply 25 to supply electricity from a commercial power source. The power supply 25 includes a power cord and power supply circuits (e.g., a bridge diode and a smoothing circuit). Specifically, the power supply 25 is configured to generate a DC power from the commercial power source and supply the DC power to each element included in the MFP 1 via a power supply line.

The memory 15, as an example of a storage for the MFP 1, may include a non-volatile memory such as an NVRAM. Further, examples of the storage for the MFP 1 may include, but are not limited to, a RAM, a ROM, an HDD, and an external storage device (e.g., a USB memory) connected with the MFP 1, as well as the aforementioned NVRAM. Further, the examples of the storage for the MFP 1 may include, but are not limited to, a combination of at least two of the aforementioned various storage devices. Further, the examples of the storage for the MFP 1 may include, but are not limited to, a file server 45 connected with the MFP 1 via the network I/F 24. Further, the examples of the storage for the MFP 1 may include, but are not limited to, non-transitory computer-readable storage media. The non-transitory computer-readable storage media are tangible media. The non-transitory computer-readable storage media may include, but are not limited to, ROMs, RAMs, NVRAMs, HDDs, CD-ROMs, and DVD-ROMs. Meanwhile, electrical signals carrying programs downloaded from a server on the Internet may be regarded as computer-readable media, but are not included in the non-transitory computer-readable storage media.

Further, the memory 15 stores various programs such as a control program 71. The control program 71 is configured to comprehensively control the elements included in the MFP 1. The CPU 12 is configured to execute the control program 71 and control the elements interconnected via the bus 11 while temporarily storing processing results into the RAM 13. Further, the memory 15 stores an authentication DB ("DB" is an abbreviation of "database") 73. As will be described later, for instance, the authentication DB 73 includes data each piece of which is associated with a user name of an individual user allowed to log in to the MFP 1, a password necessary for login authentication, and output processing to be performed by the individual user (see FIG. 2). It is noted that, in the following description, the MFP 1 executing a program such as the control program 71 may be referred to merely as a name of the apparatus. For instance, a description "the MFP 1 receives a user operation to a touch panel 21" may denote "the MFP 1 controls the touch panel 21 while executing the control program 71 by the CPU 12, thereby receiving a user operation to the touch panel 21."

The print engine 16 is configured to form an image on a sheet (e.g., a piece of paper and a transparency) under control by the CPU 12. The print engine 16 includes a photoconductive drum 161 and a toner cartridge 162 to supply toner to the photoconductive drum 161. After a circumferential surface of the photoconductive drum 161 is charged by a charger (not shown) and then exposed to laser light, an electrostatic latent image is formed thereon. The toner cartridge 162 supplies toner to the electrostatic latent image formed on the circumferential surface of the photoconductive drum 161 via a development roller (not shown), thereby forming a toner image on the circumferential surface of the photoconductive drum 161. Then, the toner image on the circumferential surface of the photoconductive drum 161 is transferred onto a sheet, and the transferred toner image is thermally fixed onto the sheet. Thus, the print engine 16 electrophotographically prints the image on the sheet. It is noted that the image forming method of the print engine 16 may not necessarily be limited to the electrophotographic method but may be any other image forming method (e.g., an inkjet method).

The image scanner 17 includes a document table (not shown) and an image sensor (not shown) such as a contact image sensor (hereinafter referred to as a "CIS") and a charge-coupled device (hereinafter referred to as a "CCD"). The image scanner 17 is configured to, while moving the image sensor relative to a document sheet placed on the document table, scan an image of the document sheet, thereby generating scanned image data. The fax communication I/F 18 is configured to communicate facsimile data with another fax machine via a telephone line.

The user I/F 20 includes the touch panel 21 and operable buttons such as a numeric keypad 22. For instance, the touch panel 21 includes a liquid crystal panel, a light source (e.g., LEDs) for emitting light from a rear side of the liquid crystal panel, and a contact sensing film overlaid on a surface of the liquid crystal panel. The user I/F 20 is configured to display various kinds of information (e.g., various setting screens and an operational status of the MFP 1) on the touch panel 21 under control by the CPU 21. Further, the user I/F 20 is configured to output, to the CPU 12, a signal according to a user operation to the touch panel 21 or the numeral keypad 22. In the illustrative embodiment, the MFP 1 has the touch panel 21 serving as both a display and an operation I/F. Nonetheless, the MFP 1 may have hardware keys as an operation I/F separate from a display.

For instance, the network I/F 24 may be a LAN ("LAN" is an abbreviation of "Local Area Network") I/F. The network I/F 24 is connected with a router 29 via a LAN cable (not shown). In the illustrative embodiment, the router 29 is connected with a plurality of PCs 41, the mail server 43, and the file server 45. The user may send a print job 75 from a PC 41 to the MFP 1 by operating the PC 41. The MFP 1 performs printing based on the print job 75 received from the PC 41. It is noted that a device to send the print job 75 to the MFP 1 is not limited to the PC 41 but may be a mobile terminal wirelessly communicable with the MFP 1. Further, the network via which the MFP 1, the PCs 41, the mail server 43, and the file server 45 are interconnected is not limited to the wired LAN but may be a wireless LAN or a WAN (including the Internet). Further, a connection between the MFP 1 and the file server 45 is not limited to the LAN connection but may be a connection complying with USB standards.

Further, the MFP 1 is configured to transmit to the mail server 43 an e-mail with an image attached thereto. For instance, the MFP 1 may attach an image based on the print job 75 to an e-mail and transmit the e-mail to the mail server 43 via communication complying with an SMTP ("SMTP" is an abbreviation of "Simple Mail Transfer Protocol"). For instance, the user may activate a mailer by operating a PC 41 and receive the e-mail with the image attached thereto from the mail server 43 via communication complying with a POP ("POP" is an abbreviation of "Post Office Protocol") 3. Thereby, the user may obtain the image (e.g., an equivalent of an image printed by the MFP 1) via the e-mail.

Further, the MFP 1 is configured to store a log image 77 into the file server 45. For instance, the log image 77 may be an image to be checked after a corresponding image has been printed by the print engine 16. For instance, the log image 77 may be an overview image representing the printed image, such as an image partially cut out of the printed image, a reduced image of the printed image, and an image having a lower resolution than the printed image. For instance, a system administrator of the image forming system 10 may later check the log image 77, thereby verifying the image printed by the user.

For instance, the MFP 1 may transmit the log image 77 to the file server 45 via communication (hereinafter, which may be referred to as "FTP communication") complying with an FTP ("FTP" is an abbreviation of "File Transfer Protocol"). The file server 45 has file folders each created for a corresponding one of users. For instance, the MFP 1 may select a folder for storing the log image 77 from among the file folders of the file server 45, based on a user name 85 set for the print job 75, and may store the log image 77 into the selected folder. Thereby, the system administrator may check later which user is associated with the log image 77. A method for associating the log image 77 with the corresponding user is not limited to creating an individual folder for storing the log image 77 in association with the corresponding user. For instance, the MFP 1 may store the log image 77 with information on the user name 85 added thereto. Further, a method for transmitting the log image 77 is not limited to the method using the FTP. For instance, the MFP 1 may transmit the log image 77 to the file server 45 via communication complying with a CIFS ("CIFS" is an abbreviation of "Common Internet File System") protocol or an SMB ("SMB" is an abbreviation of "Server Message Block") protocol.

Subsequently, the authentication DB 73 stored in the memory 15 will be described. FIG. 2 exemplifies data registered on the authentication DB 73. As exemplified in FIG. 2, the authentication DB 73 includes one or more records each of which stores a user name 111, a password 113, and multi-output execution settings 114 in association with each other. In the illustrative embodiment, the authentication DB 73 stores four user names such as "inoue." For instance, each user may be provided with a user name 111 and a password 113 by the system administrator of the image forming system 10. Each user may log in to the MFP 1, using the user name 111 and the password 113.

Further, the multi-output execution settings 114 on the authentication DB 73 represent respective settings for output processes executable based on a print job 75, and may vary depending on which user name 85 is set for the print job 75. A printing process is an output process to cause the print engine 16 to print an image based on the print job 75. A fax transmission process is an output process to cause the fax communication I/F 18 to transmit the image (e.g., JBIG image data) based on the print job 75 via facsimile communication. A server storing process is an output process to store the log image 77 into the file server 45. A mail transmission process is an output process to transmit an e-mail with the image based on the print job 75 attached, to one or more PCs 41 via the mail server 43.

When a circle is set for an output process of the multi-output execution settings, it represents that a corresponding user is allowed to perform the output process. Meanwhile, when an "x" mark is set for an output process of the multi-output execution settings, it represents that a corresponding user is prohibited from performing the output process. For instance, as shown in FIG. 2, when receiving a print job 75 for which the user name "inoue" is set, the MFP 1 performs the printing process, the fax transmission process, and the server storing process. The system administrator may change the settings as to which output processes are executable by each individual user, by changing setting values on the authentication DB 73. It is noted that a method for changing setting values on the authentication DB 73 is not limited to a specific method. For instance, setting changes of the authentication DB 73 may be received via a web page provided by a web server activated on the MFP 1.

2. Accumulation Printing Function

In the illustrative embodiment, the MFP 1 has an accumulation printing function. When the accumulation printing function is set active, in response to receiving a print job 75 from a PC 41, the MFP 1 stores the print job 75 into the memory 15 without executing the print job 75 immediately after receipt of the print job 75. For instance, the MFP 1 causes the touch panel 21 to display selectable user names 111 registered on the authentication DB 73. After one of the selectable user names 111 is selected via the touch panel 21, the MFP 1 receives an input of a password 113. The MFP 1 determines whether the combination of the selected user name 111 and the input password 113 is coincident with a combination registered on the authentication DB 73. When determining that the combination of the selected user name 111 and the input password 113 is coincident with a combination registered on the authentication DB 73, the MFP 1 determines that the authentication is successful, and receives the user attempt to log in to the MFP 1. Namely, in this case, the MFP 1 is brought into a log-in state. For instance, the print job 75 may be written in a PDL ("PDL" is an abbreviation of "Page-Description Language"). Further, a user name 85 may be set for the print job 75 by a printer driver of the PC 41 that is a sender of the print job 75. After successful completion of the authentication, the MFP 1 performs printing based on a print job 75 associated with a user name 85 coincident with the user name 111 of the log-in user among image forming jobs 75 stored in the memory 15. It is noted that the print job 75 stored in the memory 15 or the print job 75 executed after successful authentication may not completely be coincident with the print job 75 as received from the PC 41. For instance, the MFP 1 may partially change, delete, or provide additional data to the print job 75 received from the PC 41, and may store the updated print job 75 into the memory 15 and execute the updated print job 75 stored in the memory 15. Further, a method for setting the accumulation printing function active or inactive is not limited to a specific method. For instance, the MFP 1 may be configured to switch between an active mode in which the accumulation printing function is set active and an inactive mode in which the accumulation printing function is set inactive. In another instance, the MFP 1 may be configured to set the accumulation printing function active or inactive as a setting value on the authentication DB 73, depending on each of the users registered on the authentication DB 73. Thereby, the system administrator may set the accumulation printing function active or inactive for each user. In another instance, the accumulation printing function may be set active or inactive on software (e.g., the printer driver of the PC 41) for transmitting the print job 75 when the print job 75 is transmitted by the PC 41. In this case, the accumulation printing function may be set active or inactive at a user side.

Further, when executing the print job 75, the MFP 1 performs one or more corresponding output processes in accordance with the multi-output execution settings for each user on the authentication DB 73. Further, when the accumulation printing process is set inactive, for instance, the MFP 1 searches for a user name 111 coincident with the user name 85 set for the print job 75 from the authentication DB 73 without storing the received print job 75, and performs an output process associated with the found user name 111.

3. Processes by MFP

Figure 3:
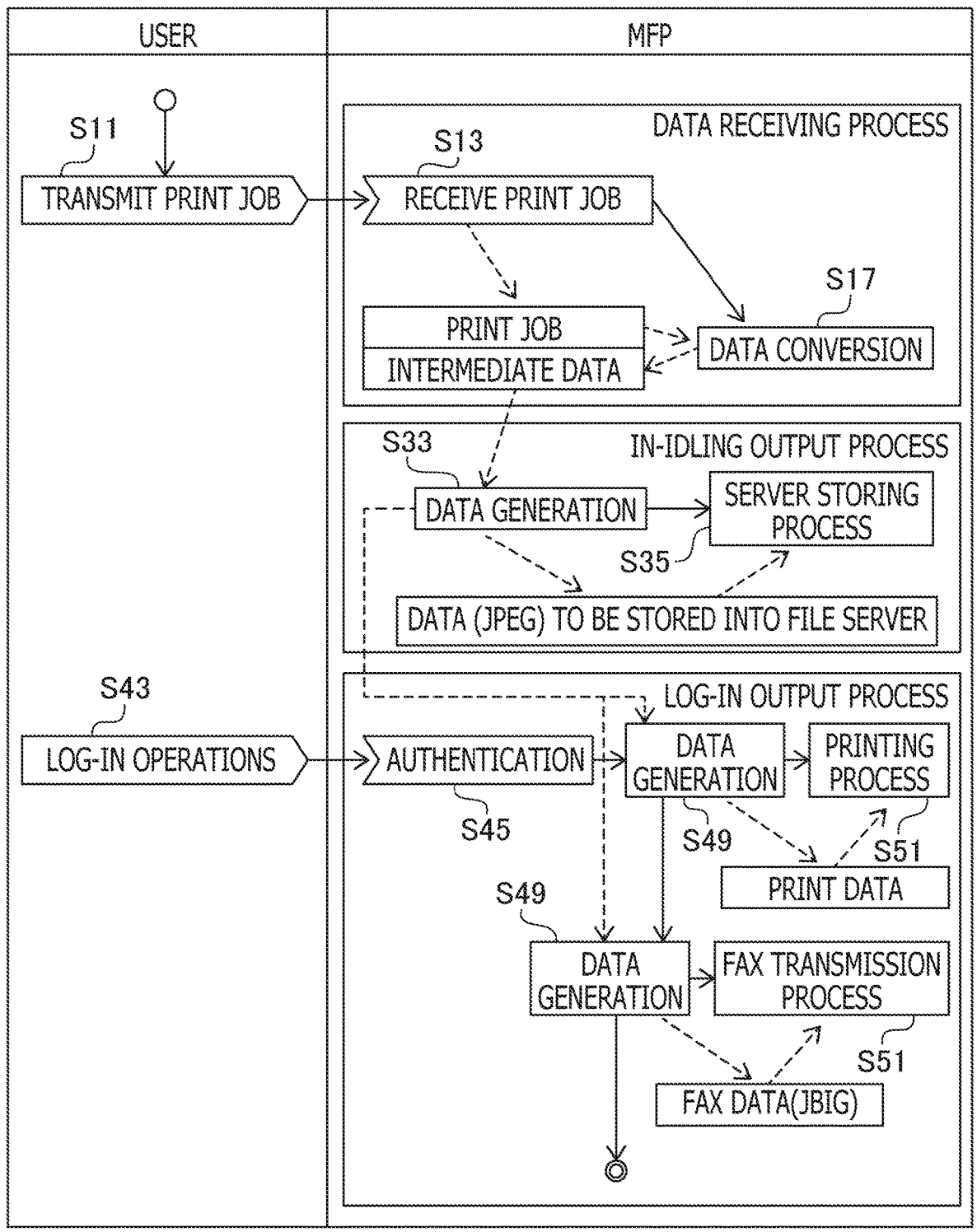
FIG. 3 is an activity diagram showing, in parallel, user operations and processes to be performed by the MFP, in the illustrative embodiment according to one or more aspects of the present disclosure.

Subsequently, exemplary processes by the MFP 1 will be described with reference to FIGS. 3 to 7. FIG. 3 is an activity diagram showing, in parallel, user operations and processes to be performed by the MFP 1. In a left frame of FIG. 3, the user operations are shown. In a right frame of FIG. 3, the processes by the MFP 1 are shown. In the illustrative embodiment, as described above, when the accumulation printing function is set active, the MFP 1 stores the received print job 75 into the memory 15. Further, the MFP 1 performs one or more corresponding output processes such as the printing process, the fax transmission process, the server storing process, and the mail transmission process, in accordance with the multi-output execution settings for each user on the authentication DB 73. In the following description, an example will be provided in which three output processes, i.e., the printing process, the fax transmission process, and the server storing process are associated with the same user as set for the received print job 75 on the authentication DB 73. In the present disclosure, the accompanying activity diagram and flowcharts may basically show processes by the CPU 12 in accordance with computer-readable instructions written in programs (e.g., the control program 71). Namely, in the following description, processes such as "determining," "receiving," and "storing" may represent processes by the CPU 12. The processes by the CPU 12 may include hardware control processes. Therefore, in the following description, a subject to perform processes may be simply referred to as the "CPU 12."

First, in S11 of FIG. 3, a user operates one of the PCs 41 and transmits a print job 75 from the PC 41 to the MFP 1. The CPU 12 of the MFP 1 receives the print job 75 from the PC 41 (S13). Further, in S13, the CPU 12 stores the received print job 75 into the memory 15.

4. Data Receiving Process

Figure 4:
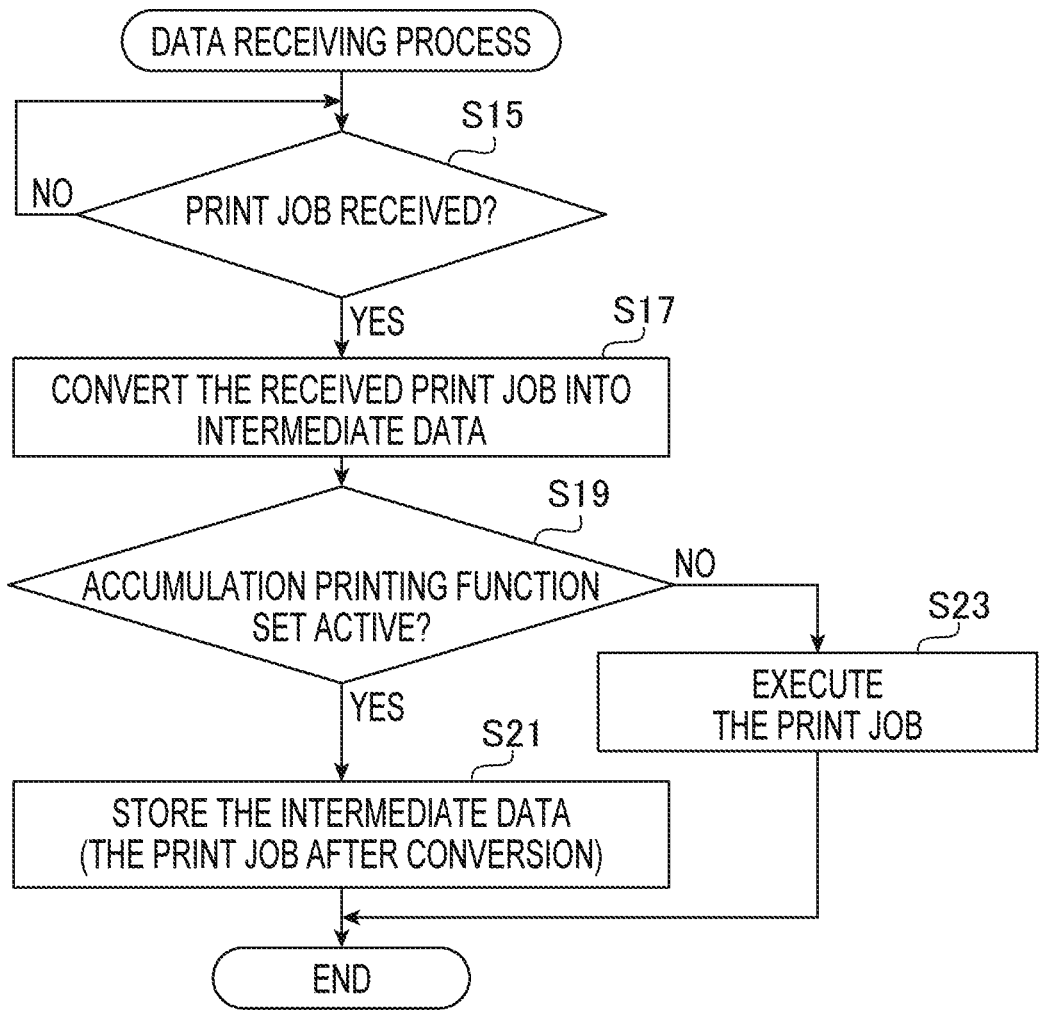
FIG. 4 is a flowchart showing a procedure of a data receiving process in the illustrative embodiment according to one or more aspects of the present disclosure.

FIG. 4 is a flowchart showing a procedure of a data receiving process to be performed by the CPU 12 when the CPU 12 receives the print job 75. For instance, the MFP 1 starts the data receiving process as shown in FIG. 4 after being powered on and beginning to execute the control program 71 by the CPU 12 thereby activating the image forming system 10. In S15 of FIG. 4, the CPU 12 determines whether the CPU 12 has received a print job 75. The CPU 12 repeatedly makes the determination in S15 until the CPU 12 receives a print job 75 from a PC 41 (S15: No).

When determining that the CPU 12 has received a print job 75 (S15: Yes), the CPU 12 converts the received print job 75 into intermediate data (S17). Specifically, for instance, in S17, the CPU 12 performs rasterization to covert image data included in the print job 75 written in the PDL into bitmap image data. Thus, in S17, the CPU 12 generates, as the intermediate data, the print job 75 including the bitmap image data. Along with generation of the bitmap image data, the CPU 12 deletes the original print job 75 written in the PDL from the memory 15, thereby releasing a storage area of the memory 15.

Next, the CPU 12 determines whether the accumulation printing function is set active (S19). When determining that the accumulation printing function is set active (S19: Yes), the CPU 12 stores the print job 75 including the bitmap image data into the memory 15 (S21). Afterward, the CPU 12 terminates the data receiving process shown in FIG. 4.

Meanwhile, when determining that the accumulation printing function is set inactive (S19: No), the CPU 12 executes the print job 75 (S23). The CPU 12 searches for multi-output execution settings associated with a user name 111 coincident with a user name 85 set for the print job 75, from the authentication DB 73. For instance, when three output processes such as the printing process, the fax transmission process, and the server storing process are set as the multi-output execution settings associated with a user name 111 on the authentication DB 73, the CPU 12 performs the printing process, the fax transmission process, and the server storing process. The CPU 12 may perform the three output processes in parallel or serially perform the three output processes. The CPU 12 generates data necessary for each of the three output processes from the intermediate data (i.e., the print job 75 including the bitmap image data) generated in S17, and outputs the generated data. After completion of the print job 75, the CPU 12 terminates the data receiving process shown in FIG. 4. It is noted that data conversion in each of the three output processes will be described later in detail.

5. In-Idling Output Process

Subsequently, an in-idling output process to be performed by the CPU 12 during an idle period will be described with reference to FIG. 5. In the illustrative embodiment, for instance, in response to receiving the print job 75, the MFP 1 performs the server storing process, among the three output processes associated with the print job 75, during the idle period. Further, the MFP 1 performs the other output processes (i.e., the printing process and the fax transmission process) in response to the user logging in to the MFP 1. It is noted that the "idle period" represents a period of time during which the MFP 1 is in an idle state where the MFP 1 is not performing any of the other output processes (e.g., the printing process) based on the print job 75 or copying in response to a user operation to the touch panel 21.

Figure 5:
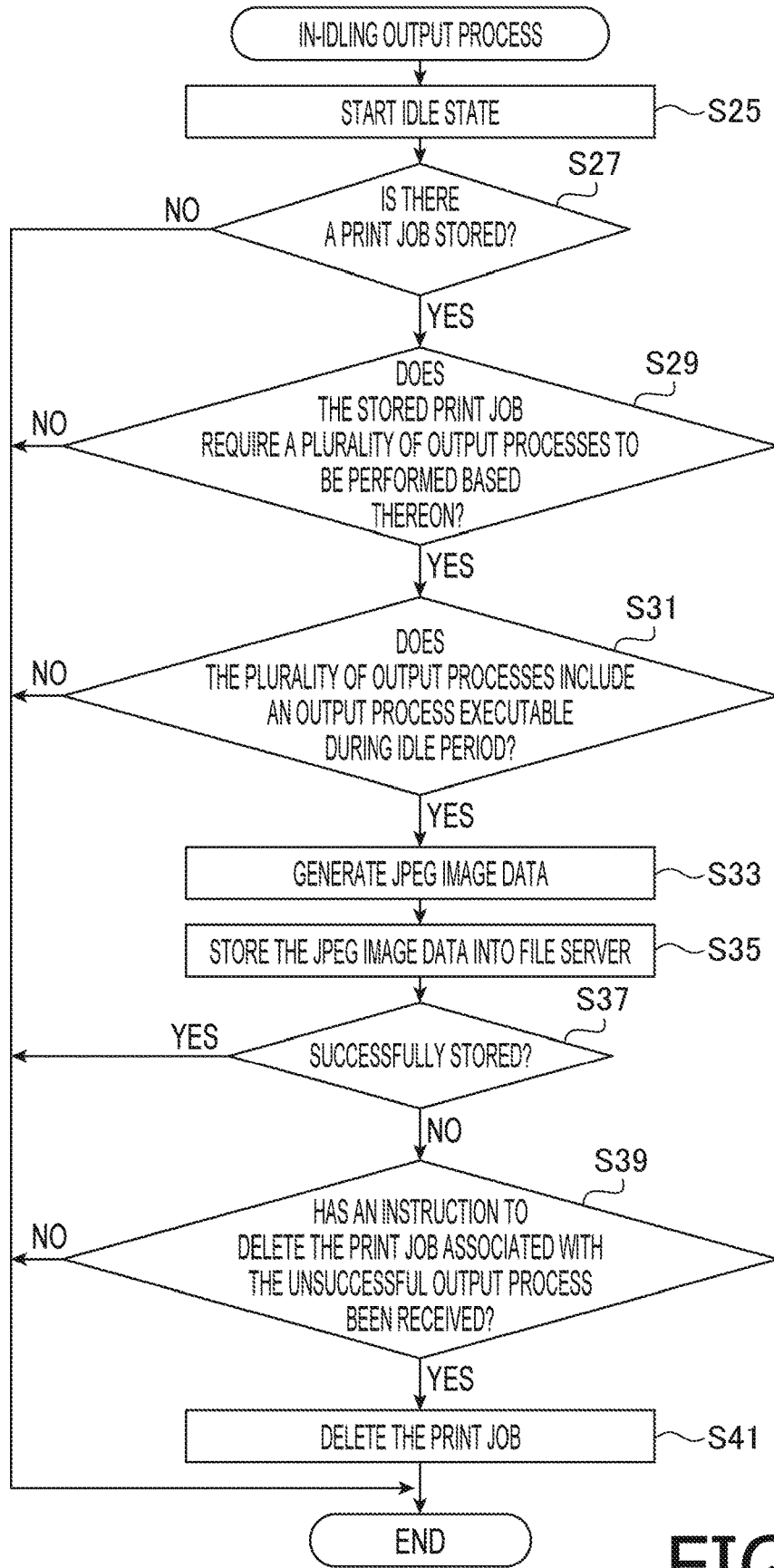
FIG. 5 is a flowchart showing a procedure of an in-idling output process in the illustrative embodiment according to one or more aspects of the present disclosure.

First, in S25 of FIG. 5, for instance, when a particular period of time has elapsed in a state where there is no print job 75 in execution, the CPU 12 is brought into the idle state. Next, the CPU 12 determines whether there is a print job 75 stored in the memory 15 (S27). When determining that there is not a print job 75 stored in the memory 15 (S27: No), the CPU 12 terminates the in-idling output process shown in FIG. 5.

Meanwhile, when determining that there is not a print job 75 stored in the memory 15 (S27: Yes), the CPU 12 determines whether the print job 75 stored in the memory 15 requires a plurality of output processes to be performed based thereon (S29). For instance, the CPU 12 searches for a user name 111 coincident with a user name 85 set for the print job 75 stored in the memory 15 from the authentication DB 73 (see FIG. 2), and determines whether the found user name 111 is associated with a plurality of output processes. When determining that the found user name 111 is associated with only one output process or finding no user name 111 coincident with the user name 85 set for the print job 75 stored in the memory 15 from the authentication DB 73, the CPU 12 determines that the print job 75 stored in the memory 15 does not require a plurality of output processes to be performed (S29: No). In this case, the CPU 12 terminates the in-idling output process shown in FIG. 5.

When determining that the found user name 111 is associated with a plurality of output processes, the CPU 12 determines that the print job 75 stored in the memory 15 requires a plurality of output processes to be performed (S29: Yes). In this case, the CPU 12 goes to S31. In S31, the CPU 12 determines whether the plurality of output processes detected in S29 include an output process executable during the idle period. For instance, the system administrator may set, on the authentication DB 73, an output process executable during the idle period. In another instance, the user who has transmitted the print job 75 may set an output process executable during the idle period, via a setting screen provided by the printer driver. An output process executable during the idle period is not limited to a specific kind of output process, but may be set on the basis of a security level required therefor. For instance, when the printing process is performed before the user logs in to the MFP 1, a printed sheet may be discharged onto a discharge tray of the MFP 1 before the user arrives at the MFP 1. In this case, there is a potential risk that another user might take the printed sheet away. Hence, in order to attain a higher security level, the printing process is preferred not to be performed during the idle period. Further, in the fax transmission process, after image data has been once transmitted to a destination fax machine, it is difficult to delete the transmitted image data. On the other hand, as will be described later, execution of the print job 75 stored in the memory 15 may be interrupted (see FIG. 6, S53: No). In an attempt to interrupt the print job 75 in execution, the user is highly likely to wish interruption of all the output processes associated with the print job 75. Therefore, the fax transmission process is preferred not to be performed during the idle period.

Further, for instance, the server storing process is a process to store the image as output by the MFP 1, as a log image 77 in the file server 45. The log image 77 stored in the file server 45 is managed, for instance, by the system administrator, and is less likely to be viewed by another user. In addition, even though the server storing process is performed before the user logs in to the MFP 1, it is possible to delete the log image 77 stored in the file server 45 in response to interruption of the print job 77 in execution. Hence, the server storing process is executable during the idle period. It is noted that a method for deleting the log image 77 stored in the file server 45 is not limited to a specific method. For instance, the CPU 12 may transmit, to the file server 45, a deletion request such as an FTP command for deleting the log image 77 stored in the file server 45. In response to receiving the deletion request, the file server 45 may overwrite the log image 77 with another piece of data, thereby deleting the log image 77. In another instance, the file server 45 may change address information of a management file in such a manner as to prevent the log image 77 stored in the file server 45 from being read out from the outside.

Further, in the mail transmission process, image data transmitted to the mail server 43 is less likely to be viewed by another user. Further, when an e-mail stored in the mail server 43 may be deleted before transmitted by the mail server 43 to a mailer, it is possible to delete the e-mail (with image data attached thereto) stored in the mail server 43, in response to interruption of the print job 75 in execution after the user logs in to the MFP 1. Therefore, when the e-mail transmitted to the mail server 43 may be deleted before transmitted to the mailer, the mail transmission process is executable during the idle period.

Referring back to FIG. 5, for instance, when the plurality of output processes detected in S29 include the server storing process, the CPU 12 determines that there is an output process executable during the idle period (S31: Yes). In S33 and the following steps, the CPU 12 performs the server storing process. Meanwhile, when the plurality of output processes detected in S29 do not include the server storing process, the CPU 12 determines that there is no output process executable during the idle period (S31: No) and terminates the in-idling output process shown in FIG. 5.

In S33, the CPU 12 generates data necessary for the server storing process from the bitmap image data included in the intermediate data (i.e., the converted print job 75) generated in S17 (see FIG. 4). Specifically, in S33, for instance, the CPU 12 generates JPEG image data as a log image 77 from the bitmap image data. It is noted that a data format of the log image 77 stored in the file server 45 is not limited to the JPEG format but may be a TIFF format.

The CPU 12 transmits the JPEG log image 77 generated in S33 to the file server 45, thereby storing the log image 77 into the file server 45 (S35). Subsequently, the CPU 12 determines whether the log image 77 has been successfully stored into the file server 45 (S37). For instance, in response to receiving from the file server 45 a response representing that the log image 77 has been successfully stored into the file server 45, the CPU 12 may determine that the log image 77 has been successfully stored into the file server 45 (S37: Yes). When determining that the log image 77 has been successfully stored into the file server 45 (S37: Yes), the CPU 12 deletes the log image 77 from the memory 15, thereby releasing a storage area of the memory 15. Then, the CPU 12 terminates the in-idling output process shown in FIG. 5. It is noted that when a plurality of print jobs 75 are stored in the memory 15, the CPU 12 may perform S29 and the following steps for each of the print jobs 75.

Meanwhile, for instance, when failing to transmit the log image 77 due to occurrence of an error in communication with the file server 45, the CPU 12 determines that the log image 77 has not been successfully stored into the file server 45 (S37: No). In another instance, when interrupting transmission of the log image 77 in response to receiving from the PC 41 an instruction to interrupt the print job 75 in execution, the CPU 12 determines that the log image 77 has not been successfully stored into the file server 45 (S37: No).

Thus, when determining that the log image 77 has not been successfully stored into the file server 45 (S37: No), the CPU 12 goes to S39.

In S39, the CPU 12 determines whether the CPU 12 has received an instruction to delete from the memory 15 the print job 75 associated with the unsuccessful server storing process in which the log image 77 has not been successfully stored into the file server 45. When the other output processes (e.g., the printing process and the fax transmission process) based on the print job 75 associated with the unsuccessful server storing process are performed, an image associated with the log image 77, which is not stored in the file server 45, is printed. In this case, even when attempting to later check what kind of image has been printed, the system administrator finds it difficult to check it, since the log image 77 representing the printed image is not stored in the file server 45. That might cause a lowered security level accordingly. Hence, in the case of the unsuccessful server storing process, the print job 75 associated therewith needs to be deleted from the memory 15.

For instance, an instruction as to whether to delete the print job 75 may be provided by changing a setting value representing the instruction on the authentication DB 73. In another instance, in S39, the CPU 12 may provide the system administrator with a notification of the failure in the server storing process, and may receive from the system administrator an instruction as to whether to delete the print job 75.

When determining that the CPU 12 has received an instruction to delete from the memory 15 the print job 75 associated with the unsuccessful server storing process (S39: Yes), the CPU 12 deletes from the memory 15 the print job 75 associated with the unsuccessful server storing process (S41). Afterward, the CPU 12 terminates the in-idling output process shown in FIG. 5. In this case, even when the user attempts to log in to the MFP 1, the CPU 12 does not perform any of the other output processes (e.g., the printing process) in response to successful log-in, since the print job 75 has already been deleted.

When determining that the CPU 12 has not received an instruction to delete from the memory 15 the print job 75 associated with the unsuccessful server storing process (S39: No), the CPU 12 terminates the in-idling output process shown in FIG. 5, without deleting the print job 75. In this case, the CPU 12 performs the other output processes (e.g., the printing process) in response to the user successfully logging in to the MFP 1. It is noted that the CPU 12 may reattempt to perform the server storing process during the idle period or after the user successfully logs in to the MFP 1.

As described above, the "idle period" may be defined as a period of time during which the MFP 1 is in an idle state where the MFP 1 is not performing any of the other output processes (e.g., the printing process) based on the print job 75 or copying in response to a user operation to the touch panel 21. Nonetheless, the definition of the "idle period" is not limited to the above one. For instance, the "idle period" may represent a period of time during which the MFP 1 is in a state where the CPU 12 has more than enough processing capability. In other words, the "idle period" may represent a period of time during which the processing load imposed on the CPU 12 is so small that even if the CPU 12 performs the server storing process, the CPU 12 can continue the other processes currently in execution without any influence from the server storing process. For instance, in a case where the CPU 12 serially receives two print jobs 75, when a processing load imposed on the CPU 12 during the data receiving process (see FIG. 4) based on the later-received print job 75 is small, the CPU 12 may perform the in-idling output process (see FIG. 5) based on the earlier-received print job 75 in parallel. Further, in response to the user logging in to the MFP 1 based on successful authentication, the CPU 12 may be brought into the log-in state from the idle state.

6. Log-in Output Process

Figure 6:
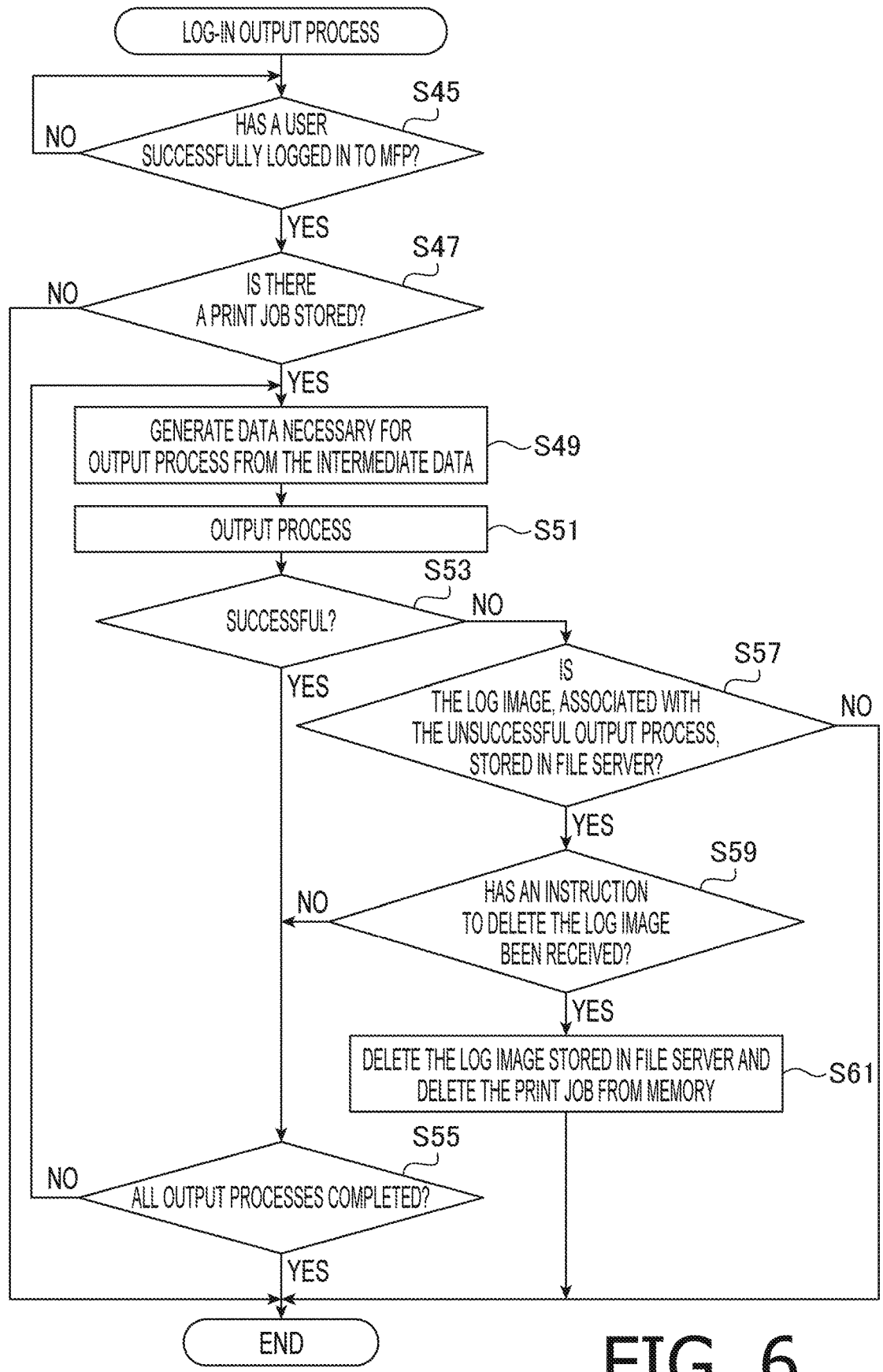
FIG. 6 is a flowchart showing a procedure of a log-in output process in the illustrative embodiment according to one or more aspects of the present disclosure.

Subsequently, a log-in output process to be performed by the CPU 12 in response to a user successfully logging in to the MFP 1 will be described with reference to FIG. 6. For instance, the MFP 1 starts the log-in output process as shown in FIG. 6 after being powered on and beginning to execute the control program 71 by the CPU 12 thereby activating the image forming system 10. In S45 of FIG. 6, the CPU 12 determines whether a user has successfully logged in to the MFP 1. For instance, after transmitting a print job 75 from a PC 41, the user moves to a position in front of the MFP 1 and performs log-in operations via the touch panel 21 (see FIG. 3, S43). Specifically, in S45, the CPU 12 determines whether a combination of a user name 111 input or selected via the touch panel 21 and a password 113 input via the touch panel 21 is correct, with reference to the authentication DB 73. When the combination of the selected user name 111 and the input password 113 is coincident with a combination of a user name 111 and a password 113 registered on the authentication DB 73, the CPU 12 determines that a user has successfully logged in to the MFP 1 (S45: Yes), and is brought into the log-in state. Meanwhile, the CPU 12 repeatedly makes the determination in S45 until a user successfully logs in to the MFP 1 (S45: No).

After brought into the log-in state, the CPU 12 determines whether there is a print job 75 stored in the memory 15 (S47). In response to the user successfully logging in to the MFP 1, the CPU 12 executes a print job 75 for which a user name 85 coincident with the user name 111 of the log-in user is set. Hence, in S47, when determining that a print job 75 associated with the user name 85 coincident with the user name 111 of the log-in user is stored in the memory 15, the CPU 12 determines that there is a print job 75 stored in the memory 15 (S47: Yes). In this case, the CPU 12 generates data necessary for performing an output process based on the identified print job 75 stored in the memory 15 (S49). Meanwhile, when determining that there is not a print job 75 stored in the memory 15 (S47: No), the CPU 12 terminates the log-in output process shown in FIG. 6.

For instance, in an attempt to perform the printing process based on the print job 75, the CPU 12 may generate print data (see FIG. 3) for the printing process from the intermediate data (more specifically, from the bitmap image data included in the print job 75 after conversion) in S49. In this case, the print data may be generated to be compressed in a run-length compression method. In another instance, in an attempt to perform the fax transmission process based on the print job 75, the CPU 12 may generate JBIG data for the fax transmission process from the intermediate data in S49. It is noted that exemplary data formats of the print data are not limited to the run-length-compressed format. Further, exemplary data formats of the data for the fax transmission process are not limited to the JBIG format but may include other encoded formats such as an MMR-encoded format, an MR-encoded format, and an MH-encoded format. Further, the CPU 12 may not necessarily generate the data for the output process from the intermediate data (i.e., the print job 75 including the bitmap image data). For instance, the CPU 12 may generate JBIG data for the fax transmission process from the print data for the printing process.

After generating the data for the output process in S49, the CPU 12 performs the output process (S51). Afterward, the CPU 12 determines whether the output process is successful (S53). For instance, in an attempt to perform the printing process as the output process, when every image has been normally printed, the CPU 12 determines that the output process is successful (S53: Yes). In another instance, in an attempt to perform the fax transmission process as the output process, when receiving from the destination fax machine a notification of safe receipt of the image data, the CPU 12 determines that the output process is successful (S53: Yes).

When determining that the output process is successful (S53: Yes), the CPU 12 deletes the data (e.g., the print data or the JBIG data) used for the output process from the memory 15, thereby releasing a storage area of the memory 15. Further, the CPU 12 determines whether all output processes have been completed (S55). When determining that all output processes have not been completed (S55: No), the CPU 12 again performs S49 and the following steps. For instance, the CPU 12 may perform the printing process during first execution of S51, and may perform the fax transmission process during second execution of S51. Further, when a plurality of print jobs 75 associated with the user name 85 coincident with the user name 111 of the log-in user are stored in the memory 15, the CPU 12 performs S49 and the following steps for each print job 75. It is noted that the CPU 12 performs the printing process and the fax transmission process in parallel.

When determining that all output processes have been completed (S55: Yes), the CPU 12 deletes the data (e.g., the print data or the JBIG data) used for the output process from the memory 15, thereby releasing a storage area of the memory 15. Further, the CPU 12 terminates the log-in output process shown in FIG. 6. Thus, the CPU 12 may perform the server storing process during the idle period prior to the user logging in to the MFP 1, and may perform the printing process and the fax transmission process in response to the user successfully logging in to the MFP 1.

Meanwhile, when determining that the output process is not successful (S53: No), the CPU 12 interrupts the print job 75 in execution. Specifically, for instance, when an error (e.g., a shortage of sheets and an out-of-toner error) has occurred in the printing process, or an error (e.g., a transmission error) has occurred in the fax transmission process, the CPU 12 may determine that the output process is not successful (S53: No) and interrupt the print job 75 in execution. In another instance, when receiving an instruction to interrupt the print job 75 in execution via the touch panel 21, the CPU 12 may determine that the output process is not successful (S53: No) and interrupt the print job 75 in execution. Thus, when determining that the output process is not successful (S53: No), the CPU 12 determines whether the log image 77, representing the image based on the print job 75 associated with the unsuccessful output process, is stored in the file server 45 (S57). When the log image 77 has been successfully stored into the file server 45 in the in-idling output process (see FIG. 5) prior to the user logging in to the MFP 1, the CPU 12 determines that the log image 77, representing the image based on the print job 75 associated with the unsuccessful output process, is stored in the file server 45 (S57: Yes). It is noted that, when interrupting the print job 75 in execution when determining that the output process is not successful (S53: No), the CPU 12 may provide a notification of the interruption of the print job 75 in execution, for instance, via the touch panel 21 or to the PC 41 of the system administrator.

When determining that the log image 77, representing the image based on the print job 75 associated with the unsuccessful output process, is stored in the file server 45 (S57: No), the CPU 12 terminates the log-in output process shown in FIG. 6. In this case, the print job 75 associated with the unsuccessful output process is left stored in the file server 45. Therefore, for instance, when having failed to print the image based on the print job 75 due to a shortage of sheets or an out-of-toner error, the CPU 12 may cause the touch panel 21 to display information for prompting the user to replenish sheets or toner. In this case, in response to detecting replenishment of sheets or toner, the CPU 12 may reattempt to perform the printing process which has not been successfully performed in the previous attempt. In another instance, when having failed to perform fax transmission based on the print job 75 due to congestion of the telephone line, the CPU 12 may reattempt to perform the fax transmission process which has not been successfully performed in the previous attempt, after a lapse of a particular period of time.

Further, when determining that the log image 77, representing the image based on the print job 75 associated with the unsuccessful output process, is stored in the file server 45 (S57: Yes), the CPU 12 determines whether the CPU 12 has received an instruction to delete the log image 77 stored in the file server 45 (S59). A method to delete the log image 77 is not limited to a specific method. For instance, when a setting value representing an instruction to delete the log image 77 is stored in the memory 15, the CPU 12 may determine that the CPU 12 has received an instruction to delete the log image 77 stored in the file server 45 (S59: Yes). In another instance, the CPU 12 may cause the touch panel 21 to display a screen for receiving an instruction as to whether to delete the log image 77. In this case, when receiving an instruction to delete the log image 77 via the touch panel 21, the CPU 12 may determine that the CPU 12 has received an instruction to delete the log image 77 stored in the file server 45 (S59: Yes).

When determining that the CPU 12 has received an instruction to delete the log image 77 stored in the file server 45 (S59: Yes), the CPU 12 deletes the log image 77 stored in the file server 45 (S61). For instance, the CPU 12 may transmit an FTP command as a deletion request to the file server 45, thereby causing the file server 45 to delete the log image 77. Further, the MFP 1 is configured to receive a setting representing an instruction to delete the print job 75 associated with the unsuccessful output process (e.g., the printing process) from the memory 15 as well as a setting representing an instruction to delete the log image 77. For instance, the MFP 1 may be configured such that, when a setting value to delete the log image 77 is set thereon, the CPU 12 automatically deletes the print job 75. In this case, when determining that the CPU 12 has received an instruction to delete the log image 77 stored in the file server 45 (S59: Yes), the CPU 12 may delete from the memory 15 the print job 75 associated with the unsuccessful output process (e.g., the printing process) (S61). Thus, the CPU 12 may delete from the memory 15 the print job 75 associated with the unsuccessful output process (e.g., the printing process) and the deleted log image 77, thereby interrupting the print job 75.

In another instance, the MFP 1 may be configured such that an instruction to delete the log image 77 and an instruction to delete the print job 75 are separately set thereon. In this case, the CPU 12 may cause the touch panel 21 to display a screen for receiving an instruction to delete the log image 77 and an instruction to delete the print job 75, and may receive an individual setting regarding each of those instructions via the touch panel 21. For example, after determining that the log image 77, representing the image based on the print job 75 associated with the unsuccessful output process, is stored in the file server 45 (S57: Yes), the CPU 12 may separately determine whether the CPU 12 has received an instruction to delete the log image 77 and whether the CPU 12 has received an instruction to delete the print job 75. Then, the CPU 12 may delete the log image 77 and/or the print job 75 in accordance with the separate determination results. After completion of S61, the CPU 12 terminates the log-in output process shown in FIG. 6.

Meanwhile, when determining that the CPU 12 has not received an instruction to delete the log image 77 stored in the file server 45 (S59: No), the CPU 12 goes to S55. In this case, the CPU 12 repeatedly performs S49 and the following steps until the CPU 12 completes all the output processes (e.g., the printing process and the fax transmission process) based on the print job 75 in execution.

7. In Case of No Output Process Executable During Idle Period

Figure 7:
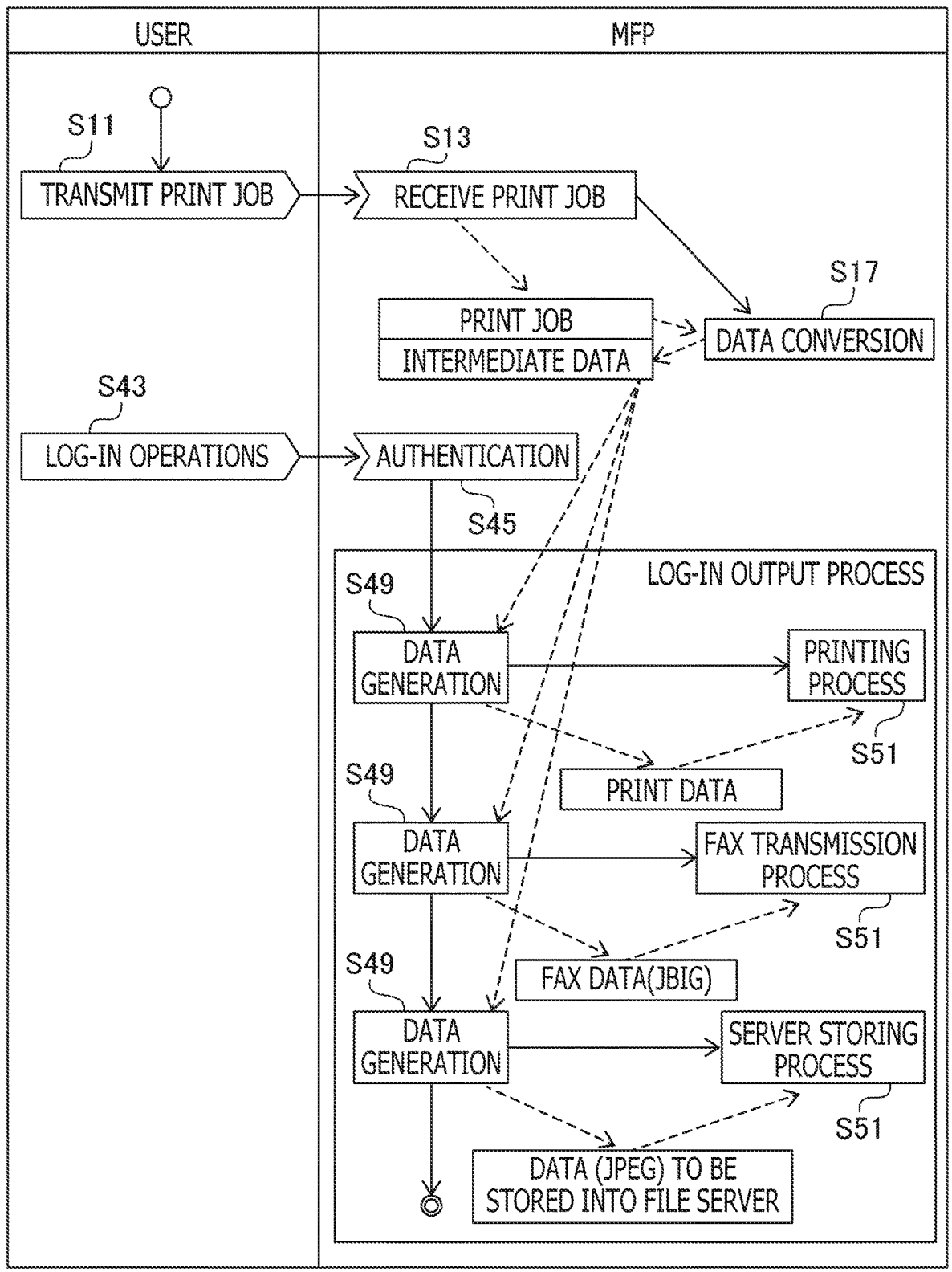
FIG. 7 is an activity diagram showing, in parallel, user operations and processes to be performed by the MFP when the MFP is not allowed to come into an idle state, in the illustrative embodiment according to one or more aspects of the present disclosure.

In the aforementioned illustrative embodiment, the MFP 1 is brought into the idle state prior to the user logging in to the MFP 1, and performs the server storing process during the idle period. However, depending on a state of the MFP 1, the MFP 1 may not be brought into the idle state before the user logs in to the MFP 1. In this case, the CPU 12 is not allowed to perform the server storing process prior to the user logging in to the MFP 1. Hence, the CPU 12 performs the server storing process after the user logs in to the MFP 1. FIG. 7 is an activity diagram when the MFP 1 has not been brought into the idle state. In the following description, substantially the same processes as exemplified above with reference to FIGS. 3 to 6 will be provided with the same reference characters, respectively, and detailed explanations thereof may be omitted.

As shown in FIG. 7, in response to receiving a print job 75 from a PC 41, the CPU 12 performs the data receiving process (see FIG. 4) and generates intermediate data from the received print job 75 (S17). Then, for instance, the MFP 1 may not be allowed to come into the idle state while a particular situation continues in which a high processing load is imposed on the CPU 12 which is executing another print job 75. Consequently, the user may attempt to log in to the MFP 1 before the CPU 12 performs the server storing process (S43 and S45). In this case, for instance, in response to the user successfully logging in to the MFP 1, the CPU 12 may perform the server storing process, which the CPU 12 has failed to perform prior to the user logging in to the MFP 1, in parallel with the other output processes such as the printing process and the fax transmission process (S49 and S51). In this case, a higher processing load is intensively imposed on the CPU 12 than in the example shown in FIG. 3. Nonetheless, the CPU 12 is allowed to perform all the output processes associated with the print job 75. In this regard, it is noted that the CPU 12 may not necessarily perform all the output processes in parallel but may serially perform the printing process, the fax transmission process, and the server storing process.

8 Timing to Generate or Delete Each Data

Subsequently, timing to generate or delete each data will be described. As described above, after receiving the print job 75, the CPU 12 generates the intermediate data (e.g., bitmap image data) from the received print job 75 (see S17 in FIG. 4). Further, the CPU 12 generates data necessary for each output process before performing each of the output processes such as the server storing process, the printing process, and the fax transmission process (see S33 in FIG. 5, S49 in FIG. 6). Then, after completion of each output process, the CPU 12 deletes the data used for each output process from the memory 15. However, timing to generate or delete each data is not limited to the above-exemplified one.

FIGS. 8 to 11 show timing to generate or delete each data in another example. In FIGS. 8 to 11, each rectangular frame drawn by a solid line shows data completely generated in a corresponding phase. Further, each rectangular frame surrounded by a dashed line shows data that has not yet been generated in a corresponding phase. In addition, each X mark indicates deleted data. Unlike the aforementioned illustrative embodiment, in the example shown in FIGS. 8 to 11, all necessary types of data are previously generated.

Figure 8:
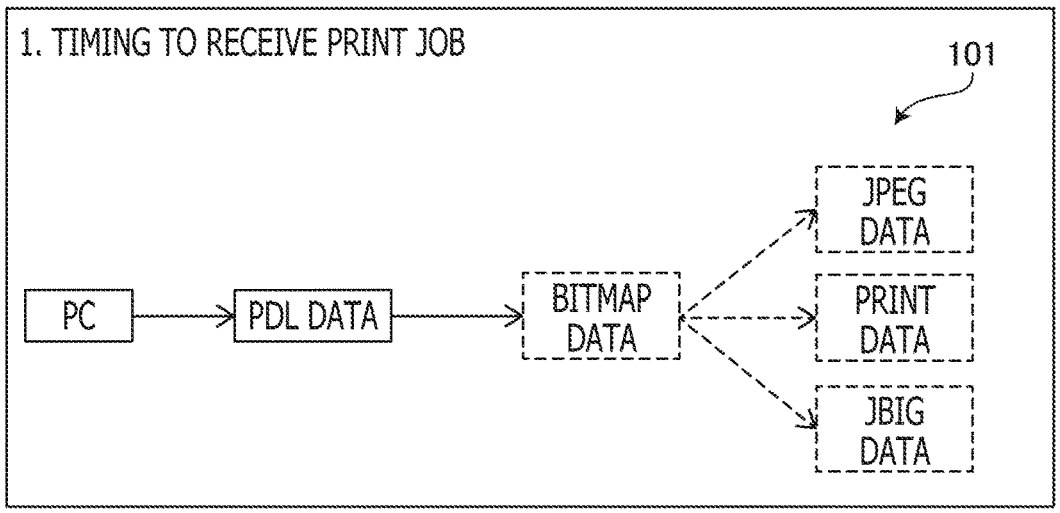
FIGS. 8 to 11 show timing to generate or delete each data in another example of the illustrative embodiment according to one or more aspects of the present disclosure.

FIG. 8 shows a phase 101 in which that the CPU 12 performs the following process at a timing at which the CPU 12 receives a print job 75. Specifically, as shown in FIG. 8, the CPU 12 receives a print job 75 written in the PLD from a PC 41, and stores the received print job 75 into the memory 15 (Phase 101). In this phase, the CPU 12 does not generate intermediate data (e.g., bitmap image data) indicated by a dashed line.

Figure 9:
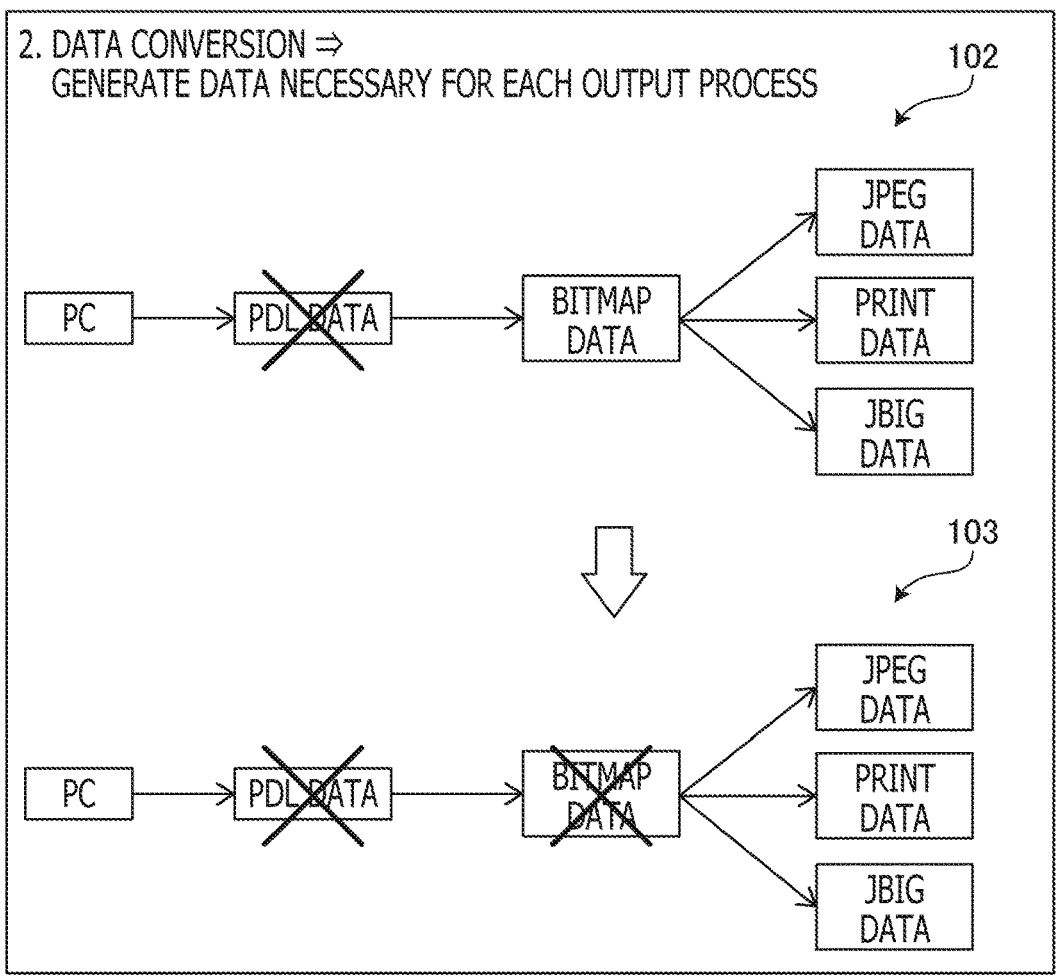

FIG. 9 shows phases 102 and 103 in which the CPU 12 performs a data conversion process after receiving the print job 75. For instance, the CPU 12 may perform the data conversion process of the phases 102 and 103 immediately after receipt of the print job 75. In another instance, the CPU 12 may perform the data conversion process of the phases 102 and 103 at a timing at which the processing load imposed on the CPU 12 becomes smaller (e.g., than a particular level) after receipt of the print job 75. Specifically, the CPU 12 generates bitmap image data (i.e., intermediate data) from image data (hereinafter referred to as "PDL image data") included in the print job 75 stored in the memory 15, and deletes from the memory 15 the PDL image data that has become unnecessary after generation of the bitmap image data (Phase 102). The CPU 12 determines one or more output processes associated with a user name 111 coincident with a user name 85 for the print job 75, with reference to the authentication DB 73. Then, the CPU 12 generates data necessary for the one or more output processes to be performed. Specifically, for instance, the CPU 12 generates, from the bitmap image data, JPEG image data (i.e., a log image 77) for the server storing process, print data for the printing process, and JBIG image data for the fax transmission process. After generation of the data for each output process, the CPU 12 deletes the bitmap image data from the memory 15 (Phase 103). For instance, the CPU 12 may perform the processes of the phases 102 and 103 in S17 (see FIG. 4) or S33 (see FIG. 5).

Figure 10:
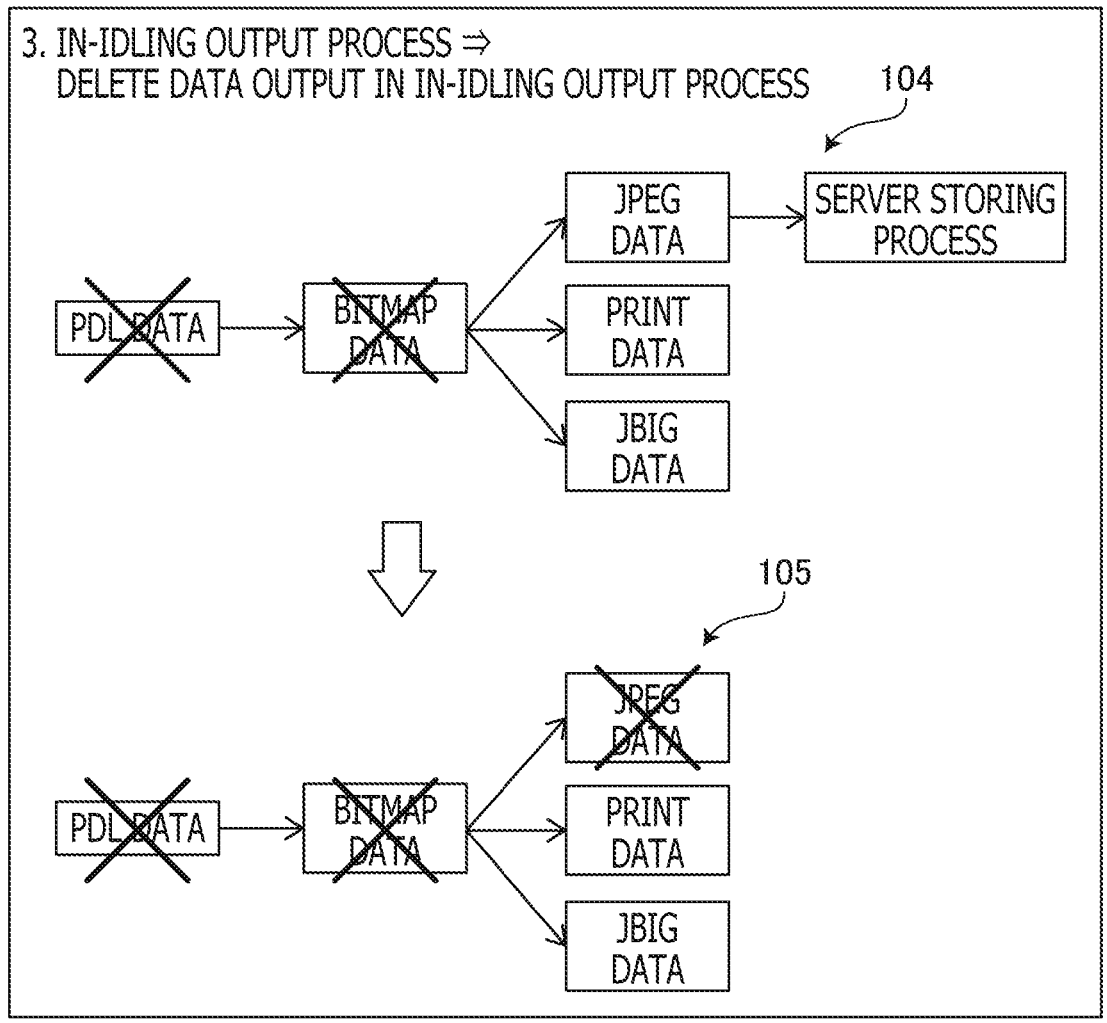

FIG. 10 shows phases 104 and 105 in which the CPU 12 performs the server storing process during the idle period. Specifically, the CPU 12 performs the server storing process using the JPEG image data generated in the phase 102 (Phase 104). After successfully storing the JPEG image data into the file server 45 (see FIG. 5, S37: Yes), the CPU 12 deletes from the memory 15 the JPEG data used for the server storing process (Phase 105). Meanwhile, the print data and the JBIG image data are left stored in the memory 15.

Figure 11:
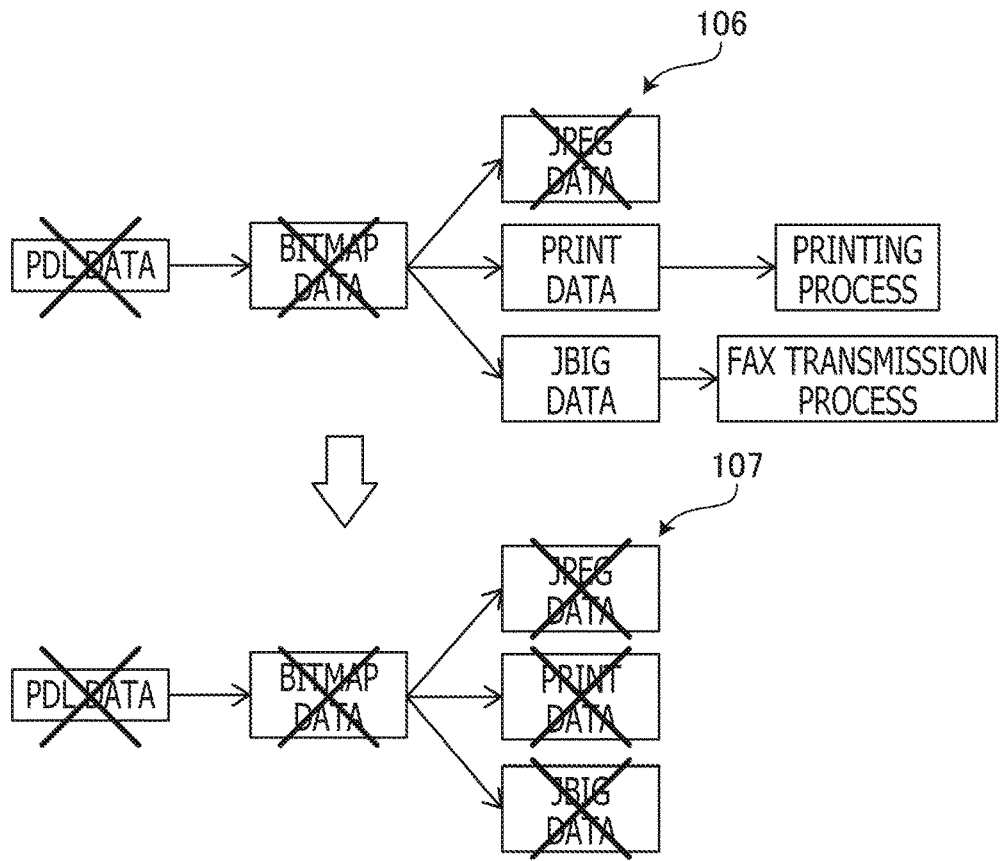

FIG. 11 shows phases 106 and 107 in which the CPU 12 performs the printing process and the fax transmission process in response to the user successfully logging in to the MFP 1. As described above, at a timing at which the user performs the log-in operations in an attempt to log in to the MFP 1, the print data and the JBIG image data are stored in the memory 15. The CPU 12 reads out the print data from the memory 15 and performs the printing process, and reads out the JBIG image data from the memory 15 and performs the fax transmission process (Phase 106). After completion of the printing process, the CPU 12 deletes the print data and the JBIG image data from the memory 15 (Phase 107). For instance, after successfully completing each output process, the CPU 12 may delete from the memory 15 corresponding data used for each output process. In the processing procedure shown in FIGS. 8 to 11, the CPU 12 previously generates the data (e.g., the JPEG image data, the print data, and the JBIG image data) for the output processes to be performed. Therefore, although a large storage area of the memory 15 is used for storing the previously-generated data, previously generating the data for each output process makes it possible to promptly start the printing process and the fax transmission process after the successful log-in. Accordingly, for instance, when the storage capacity of the memory 15 is large enough, and a higher processing speed is required, the aforementioned processing procedure is useful.

Subsequently, another processing procedure will be described. FIGS. 12 to 15 show timing to generate or delete each data in a further example. In a processing procedure shown in FIGS. 12 to 15, the CPU 12 generates necessary data from the print job 75 (i.e., the PDL image data) immediately before performing each output process. In the following description, substantially the same processes as exemplified above with reference to FIGS. 8 to 11 will be provided with the same reference characters, respectively, and detailed explanations thereof may be omitted.

Figure 12:
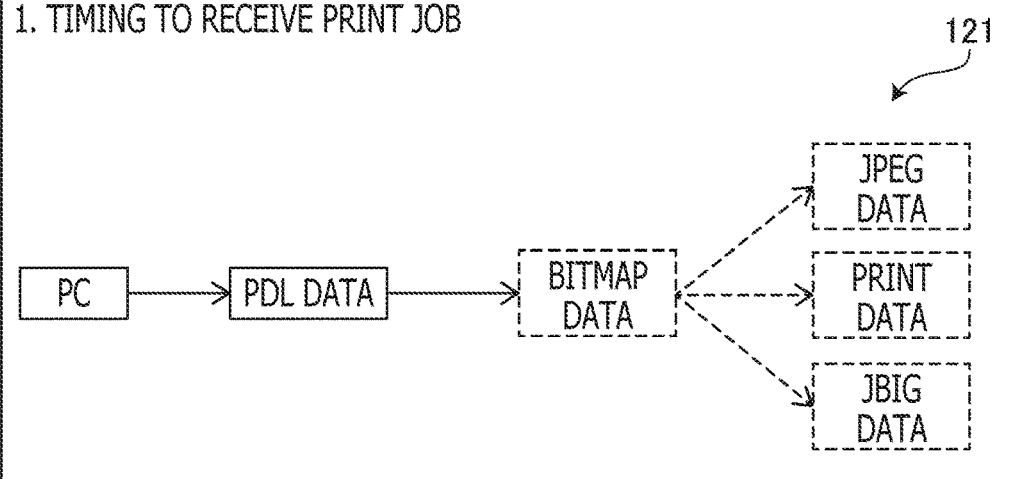
FIGS. 12 to 15 show timing to generate or delete each data in a further example of the illustrative embodiment according to one or more aspects of the present disclosure.
Figure 13:
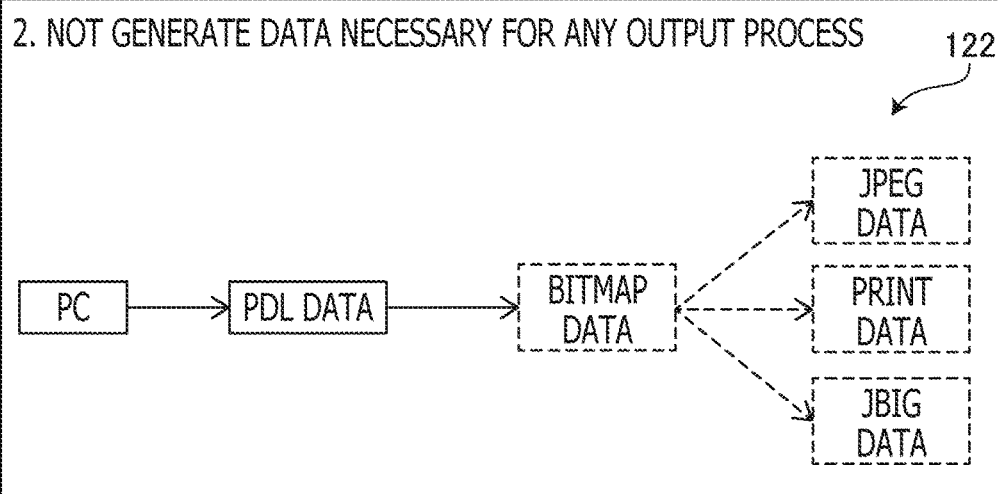

FIG. 12 shows a phase 121 in which that the CPU 12 performs the following process at a timing at which the CPU 12 receives a print job 75. Specifically, in the same manner as described above with reference to FIG. 8, the CPU 12 receives a print job 75 written in the PLD from a PC 41 and stores the received print job 75 into the memory 15 (Phase 121). In this phase, the CPU 12 does not generate intermediate data (e.g., bitmap image data). In general, PDL image data has a smaller data size than bitmap image data. Therefore, when the PDL image data is stored as is into the memory 15, it is possible to reduce storage area usage in the memory 15.

Figure 14:
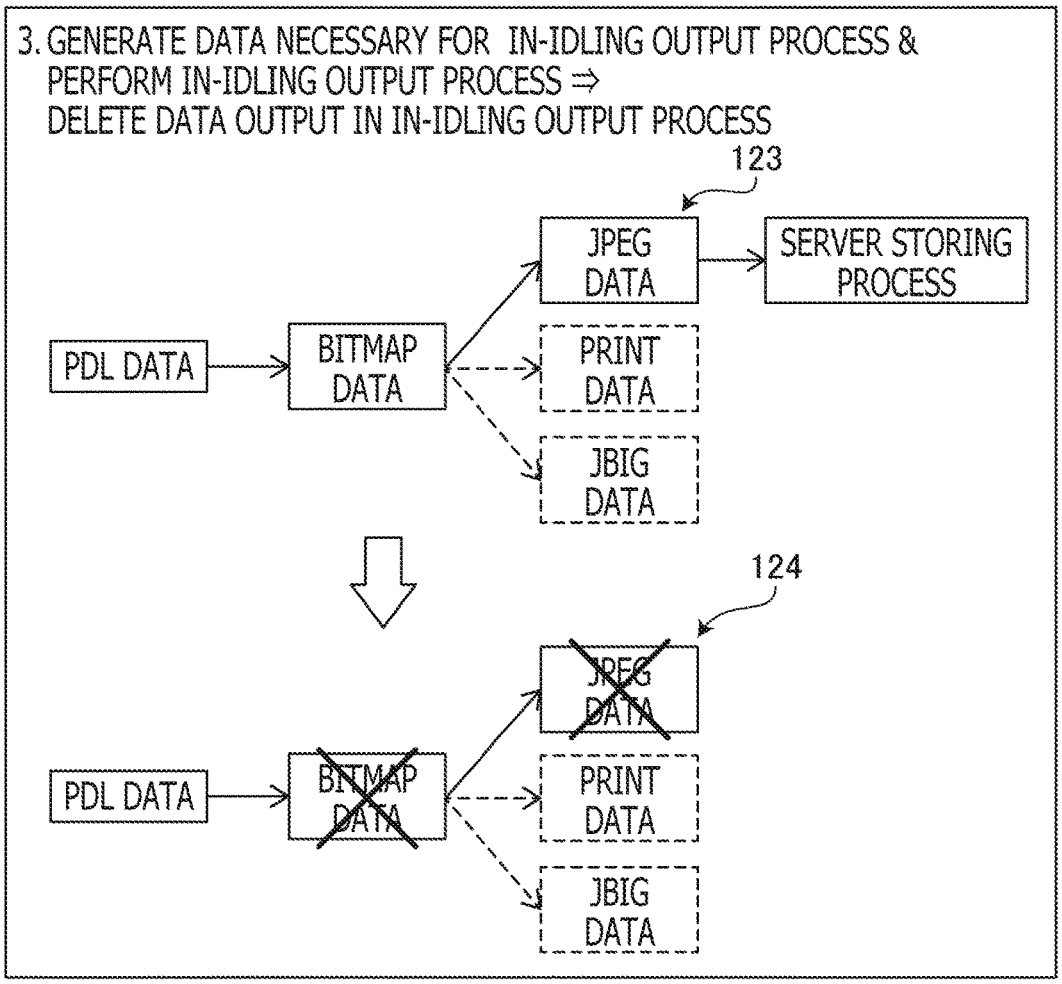

FIG. 14 shows phases 123 and 124 in which the CPU 12 performs the server storing process during the idle period. Specifically, the CPU 12 generates bitmap image data from the PDL image data stored in the memory 15, and generates JPEG image data from the bitmap image data, and stores the JPEG image data (i.e., the log image 77) into the file server 45 (Phase 123). After successfully storing the log image 77 into the file server 45, the CPU 12 deletes the JPEG image data and the bitmap image data from the memory 15 (Phase 124). Thus, by deleting the JPEG image data and the bitmap image data from the memory 15, that is, by leaving only the PDL image data among all the image data stored in the memory 15, the storage area of the memory 15 may be released as much as possible.

Figure 15:
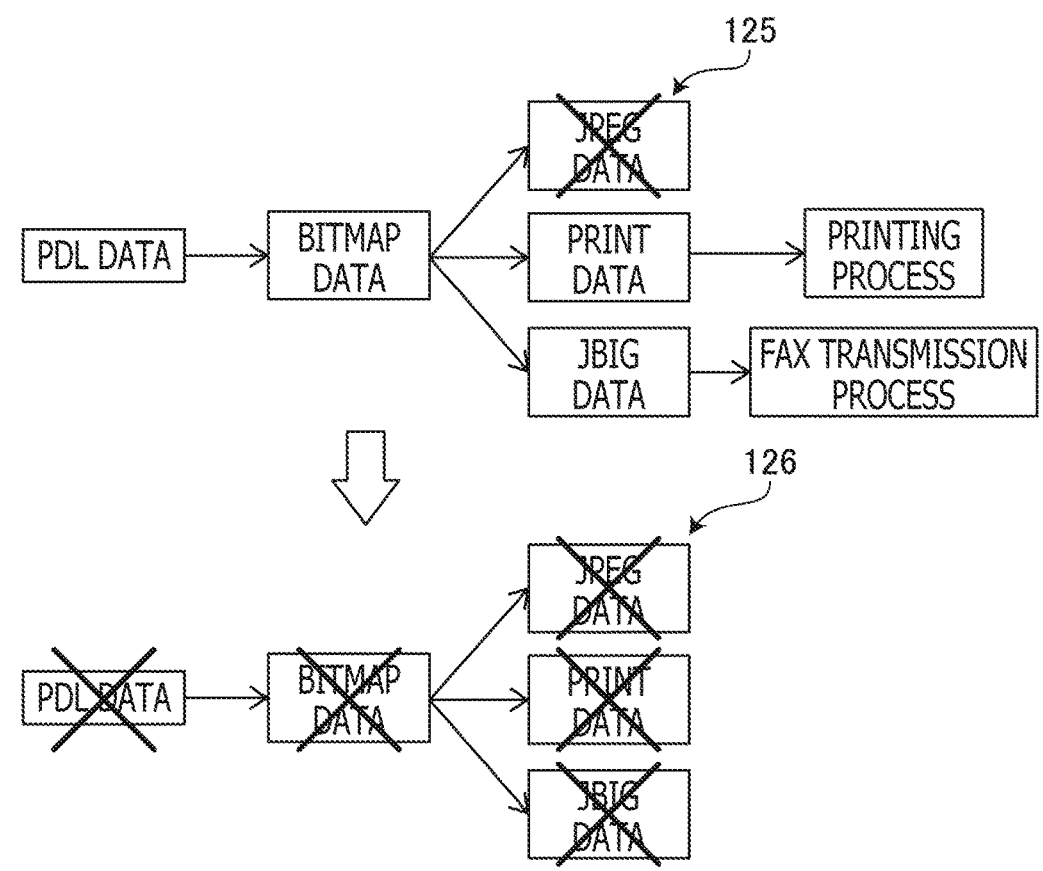

FIG. 15 shows phases 125 and 126 in which the CPU 12 performs the printing process and the fax transmission process in response to the user successfully logging in to the MFP 1. As described above, at a timing at which the user performs the log-in operations in an attempt to log in to the MFP 1, no image data but the PDL image data is stored in the memory 15. Accordingly, the CPU 12 generates bitmap image data from the PDL image data, and generates print data and JBIG image data from the bitmap image data (Phase 125). Then, the CPU 12 performs the printing process and the fax transmission process, using the generated data (Phase 125). After normal completion of the printing process, the CPU 12 deletes from the memory 15 the bitmap image data, the print data, and the JBIG image data (Phase 126). According to the processing procedure shown in FIGS. 12 to 15, no image data but the PDL image data, which has the smallest possible data size among all the image data, is stored in the memory 15. Thus, it is possible to reduce storage area usage in the memory 15 and prevent an insufficient storage capacity. On the other hand, since each data such as the print data and the JBIG image data needs to be generated from the PDL image data immediately before execution of a corresponding output process, there is a potential risk that the corresponding output process might be started late. Accordingly, the processing procedure shown in FIGS. 12 to 15 may be useful, for instance, in a case where the memory 15 has a small storage area, and the user wishes to certainly avoid a shortage of an available storage capacity.

The CPU 12 may perform a combination of at least two of the processing procedure as exemplified in the aforementioned illustrative embodiment, the processing procedure as exemplified in FIGS. 8 to 11, and the processing procedure as exemplified in FIGS. 12 to 15. For instance, the CPU 12 may change the processing procedure to be used, depending on a storage capacity available at the timing at which the CPU 12 receives the print job 75. Specifically, when the memory 15 has a large storage capacity available at the timing at which the CPU 12 receives the print job 75, the CPU 12 may perform the processing procedure shown in FIGS. 8 to 11. Meanwhile, when the memory 15 has a small storage capacity available at the timing at which the CPU 12 receives the print job 75, the CPU 12 may perform the processing procedure shown in FIGS. 12 to 15. In another instance, the CPU 12 may receive a selection of the processing procedure to be used, via the touch panel 21.

9. Advantageous Effects

The illustrative embodiment as described above may provide the following advantageous effects. The MFP 1 of the illustrative embodiment includes the network I/F 24, the memory 15, the CPU 12, and the print engine 16. The CPU 12 receives a print job 75 via the network I/F 24 and stores the received print job 75 into the memory 15 (S13). The CPU 12 acquires authentication information (e.g., a user name and a password) associated with the stored print job 75, and perform authentication based on the acquired authentication, and determines whether the authentication is successful (S45). When determining that the authentication is successful, the CPU 12 performs the printing process to cause the print engine 16 to form, on a sheet, an image based on the print job 75 (S51). Regardless of whether the authentication is successful, the CPU 12 performs the server storing process to transmit, via the network I/F 24, the log image 77 based on the print job 75 (S35).

Thus, the MFP 1 performs a plurality of output processes such as the printing process (S51) and the server string process (S35), based on the print job 75. In response to successful authentication based on the received identification information (S45: Yes), the CPU 12 performs the printing process (S51). Further, regardless of whether the authentication based on the received identification information is successful, the CPU 12 performs the server storing process (S35). The CPU 12 may perform the server storing process prior to performing the authentication based on the received identification information. Thereby, it is possible to distribute, before and after the authentication, a processing load imposed on the CPU 12 to perform the output processes based on the print job 75. Namely, it is possible to make the output processes less concentrated than when the server storing process and the printing process are performed in response to the successful authentication. Accordingly, it is possible to reduce a period of time required until completing the printing process after the successful authentication. Further, since the printing process is performed after the successful authentication, it is possible to make lower a potential risk that another user might see an image printed in the printing process than when the printing process is performed before the authentication. Thus, it is possible to improve a security level for the printing process.

The server storing process (hereinafter, which may be referred to as a "first transmission process") in S35 is a process to transmit the log image 77 to the file server 45 via the network I/F 24. More specifically, in the server storing process, the log image 77 is transmitted to the file server 45 in a transmission method complying with a protocol configured to delete the log image 77 transmitted to the file server 45 by transmitting a deletion request to the file server 45.

For instance, after having performed the server storing process in advance, the CPU 12 may interrupt the print job 75 when performing the printing process. In this case, the user may wish to delete the log image 77 stored in the file server 45 in the server storing process along with interruption of the print job 75. Even in such a situation, according to the transmission method complying with the aforementioned protocol, the CPU 12 may delete the log image 77 stored in the file server 45 by transmitting the deletion request to the file server 45 in the transmission method in response to interruption of the print job 75.

Further, the CPU 12 may perform a second transmission process (e.g., the fax transmission process and the mail transmission process) to transmit image data based on the print job 75 via at least one of facsimile communication and an e-mail. When determining that the authentication based on the received identification information is successful (S45: Yes), the CPU 12 performs the printing process and the fax transmission process (S51).

For instance, when image data is transmitted to an external device (e.g., a destination fax machine and a mail server) via facsimile transmission or an e-mail, it may be difficult to later delete the transmitted image data. Namely, after the second transmission process (e.g., the fax transmission process and the mail transmission process) has been performed prior to the printing process, even when the user attempts to delete the image transmitted to the external device in response to interruption of the print job 75, the user's attempt may be unsuccessful. Meanwhile, in the illustrative embodiment, the second transmission process is performed when it is determined that the printing process is sure to be performed in response to the successful authentication. Thereby, it is possible to prevent such an undesired situation that the image data transmitted to the external device is unable to be deleted in response to interruption of the print job 75.

Further, in an attempt to interrupt the print job 75, the CPU 12 transmits a deletion request to the file server 45, thereby causing the file server 45 to delete the log image 77 stored in the server storing process (S61). Namely, the CPU 12 may delete the log image 77 transmitted in the server storing process, by transmitting the deletion request to the file server 45 in response to the attempt to interrupt the print job 75. Thus, it is possible to prevent such an undesired situation that the log image 77 associated with the interrupted print job 75 continues to be stored in the file server 45.

Further, in the attempt to interrupt the print job 75, the CPU 12 determines whether the CPU 12 has received an instruction to delete the log image 77 transmitted in the server storing process (S59). When determining that the CPU 12 has received an instruction to delete the log image 77 transmitted in the server storing process (S59: Yes), the CPU 12 transmits the deletion request to the file server 45, thereby causing the file server 45 to delete the log image 77 transmitted in the server storing process (S61). Thus, the MFP 1 may be provided with an instruction as to whether to delete the transmitted log image 77 in response to an attempt to interrupt the print job 75.

Further, in an attempt to interrupt the server storing process, the CPU 12 interrupts the print job 75 in execution (S41). Thus, the CPU 12 may interrupt the print job 75 in execution, along with interruption of the server storing process.

Further, the log image 77 transmitted in the server storing process based on the print job 75 is associated with the image printed in the printing process based on the print job 75. Namely, the log image 77 transmitted in the server storing process may be image data representing the image printed in the printing process. Accordingly, when the log image 77 has been transmitted to the file server 45 in the server storing process, the system administrator (or the user) may later check the log image 77 stored in the file server 45, thereby verifying the image printed in the printing process. Further, when failing to store the log image 77 into the file server 45 and attempting to interrupt the server storing process, the CPU 12 may interrupt the print job 75, thereby preventing such an undesired situation that the CPU 12 executes the print job 75 in spite of no log image 77 stored in association with the print job 75. Thus, the CPU 12 may perform an appropriate process in the attempt to interrupt the server storing process.

Further, in the attempt to interrupt the server storing process, the CPU 12 may determine whether an instruction to interrupt the print job 75 has been received (S39). When determining that an instruction to interrupt the print job 75 has been received (S39: Yes), the CPU 12 interrupts the print job 75 in execution (S41). Thus, the MFP 1 may be provided with an instruction as to whether to interrupt the print job 75 in response to the attempt to interrupt the server storing process.

Further, prior to performing the server storing process, the CPU 12 generates print data to be used for the printing process, based on the print job 75 (see FIG. 9). Thereafter, when determining that the authentication is successful, the CPU 12 performs the printing process based on the print data (see FIG. 11). Thus, since the CPU 12 generates the print data prior to performing the server storing process, the CPU 12 may promptly start the printing process after the successful authentication. Accordingly, it is possible to further shorten the period of time required until completing the printing process after the successful authentication.

Further, when determining that the authentication is successful, the CPU 12 may generate the print data based on the print job 75 and perform the printing process based on the generated print data (see FIG. 15). Thus, the CPU 12 may not generate the print data until the successful authentication. Hence, since the CPU 12 does not generate the print data until right before performing the printing process, it is possible to prevent a shortage of an available storage capacity of the memory 15, without exerting pressure on the storage area of the memory 15.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and is capable of changes or modifications within the scope of the inventive concept as expressed herein. For instance, the following modifications according to aspects of the present disclosure are feasible.

10. Modifications

In the aforementioned illustrative embodiment, the authentication is performed, for instance, based on the user name 111 and the password 113 input via the touch panel 21, and the user name 111 and the password 113 registered on the authentication DB 73 stored in the memory 15. Nonetheless, the method for performing the authentication is not limited to the above-exemplified one. For instance, the MFP 1 may receive authentication information from an authentication card or a mobile phone via wireless communication such as Bluetooth (registered trademark) communication and Wi-Fi (registered trademark) communication. Further, in this case, the MFP 1 may perform the authentication by comparing the received authentication information and the authentication data registered on the authentication DB 73. In another instance, the MFP 1 may perform the authentication, using an authentication server on the network. In this case, the authentication DB 73 may be stored in the authentication server. In a further instance, the sender (e.g., the printer driver of the PC 41) of the print job 75 may set authentication information (e.g., a password and a PIN code) in association with the print job 75. In this case, the MFP 1 may perform the authentication based on the authentication information associated with the received print job 75. Further, in this case, the MFP 1 may perform biometric authentication such as fingerprint authentication.

Further, the protocol used for the server storing process may be a protocol configured to prohibit the MFP 1 from deleting the log image 77 once stored in the file server 45. Further, in the aforementioned illustrative embodiment, the printing process is employed as an image forming process according to aspects of the present disclosure. Nonetheless, other image forming processes such as an image scanning process and the fax transmission process may be employed. For instance, the MFP 1 may be configured to perform only the server storing process and the fax transmission process as the output processes. In this case, the MFP 1 may be further configured to transmit to the file server 45 a log image 77 associated with the image data to be transmitted in the fax transmission process. Further, in an attempt to interrupt the print job 75, the CPU 12 may leave the log image 77 stored in the file server 45, without deleting the log image 77. Further, the CPU 12 may not necessarily perform the process, as performed in S59, of determining whether the CPU 12 has received an instruction to delete the log image 77 stored in the file server 45. For instance, when determining that the log image 77, representing the image based on the print job 75 associated with the unsuccessful output process, is stored in the file server 45 (S57: Yes), the CPU 12 may automatically delete the log image 77.

Further, the CPU 12 may not necessarily perform the process, as performed in S61, of interrupting the print job 75 along with deletion of the log image 77 from the file server 45. Further, the image data to be transmitted to the file server 45 in the server storing process is not limited to the log image 77 but may be other image data such as the same data as the print data based on which the printing process is performed. Further, the CPU 12 may not necessarily perform the process, as performed in S39, of determining whether the CPU 12 has received an instruction to delete from the memory 15 the print job 75 associated with the unsuccessful server storing process. For instance, when determining that the CPU 12 has received an instruction to delete from the memory 15 the print job 75 associated with the unsuccessful server storing process (S39: Yes), the CPU 12 may automatically delete the print job 75. Further, in the image forming system 10 of the aforementioned illustrative embodiment, the data receiving process (see FIG. 4), the in-idling output process (see FIG. 5), and the log-in output process (see FIG. 6) are performed by the CPU 12. Nonetheless, a part or a whole of the processes shown in FIGS. 4 to 6 may be performed by another controller. For instance, the communication of the print job 75 between the MFP 1 and the PC 41 may be primarily controlled by a controller of the file server 45. The file server 45 may periodically inquire of each PC 41 whether there is a print job 75 to be executed, and may transmit to the MFP 1 a print job 75 received from a PC 41. In this case, the file server 45 may store one or more print jobs 75, and may generate a log image 77 and store or transmit the generated log image 77. Further, the MFP 1 may perform the authentication as performed in S45, using the file server 45 as an authentication server. Further, in response to successful authentication, the file server 45 may transmit to the MFP 1 an identified one of the one or more print jobs 75 stored in the file server 45, thereby causing the MFP 1 to perform the printing process based on the identified print job 75.

Further, a storage for storing the control program 71 is not limited to the memory 15 but may be a computer-readable storage medium such as a RAM, an HDD, a CD-ROM, and a DVD-ROM. Further, in the aforementioned illustrative embodiment, the CPU 12 is used as a "controller" according to aspects of the present disclosure. Nonetheless, examples of the "controller" may include but are not limited to a specific hardware element such as an ASIC ("ASIC" is an abbreviation of "Application Specific Integrated Circuit"). Further, functions of the "controller" may be achieved in cooperation between processes according to software and processes by hardware elements.

Associations between elements exemplified in the aforementioned illustrative embodiments and elements according to aspects of the present disclosure will be exemplified below. The MFP 1 may be an example of an "image processing apparatus" according to aspects of the present disclosure. The print engine 16 may be an example of a "print engine" according to aspects of the present disclosure. The network I/F 24 may be an example of a "communication interface" according to aspects of the present disclosure. The CPU 12 may be an example of a "controller" according to aspects of the present disclosure. The memory 15 may be an example of a "memory" according to aspects of the present disclosure. Further, the memory 15 may be an example of a "non-transitory computer-readable medium" according to aspects of the present disclosure. Moreover, the memory 15 may be included in the "controller" according to aspects of the present disclosure. The log image 77 may be an example of "particular image data" according to aspects of the present disclosure. The file server 45 may be an example of an "external device" according to aspects of the present disclosure. Further, the file server 45 may be an example of a "server" according to aspects of the present disclosure. The user I/F 20 may be an example of a "user interface" according to the present disclosure.

What is claimed is:

1. An image processing apparatus comprising:
   a print engine;
   a communication network interface device;
   a memory; and
   a processor comprising hardware, the processor being configured to:
      receive a print job via the communication network interface device;
      store the received print job into the memory; and
      based on the print job stored in the memory, perform a plurality of output processes comprising:
         a first output process comprising:
            acquiring authentication information associated with the print job;
            performing authentication based on the acquired authentication information, and determining whether the authentication is successful;
            when determining that the authentication is successful, causing the print engine to print an image on a sheet based on the print job; and
         a second output process comprising:
            prior to performing the authentication, generating overview image data based on the print job and transmitting the generated overview image data to an external device via the communication network interface device, the overview image data representing a log image as an overview image of the image to be formed based on the print job.

2. The image processing apparatus according to claim 1, wherein the processor is further configured to:
   transmit a deletion request to the external device via the communication network interface device in the particular transmission method when determining to delete the overview image data transmitted to the external device.

3. The image processing apparatus according to claim 1, wherein the processor is further configured to:
   when determining that the authentication is successful, cause the print engine to print an image based on the print job, and transmit specific image data based on the print job via at least one of facsimile communication and an e-mail.

4. The image processing apparatus according to claim 2, wherein the processor is further configured to:
   when determining to interrupt the print job, transmit the deletion request to the external device via the communication network interface device to delete the overview image data.

5. The image processing apparatus according to claim 2, wherein the processor is further configured to:
   when determining to interrupt the print job, determine whether an instruction to delete the overview image data transmitted to the external device is received;
   when determining that the instruction to delete the overview image data transmitted to the external device is received, transmit the deletion request to the external device via the communication network interface device to delete the overview image data.

6. The image processing apparatus according to claim 1, wherein the processor is further configured to:
   when determining to interrupt transmission of the overview image data to the external device, interrupt the print job in execution.

7. The image processing apparatus according to claim 1, wherein the processor is further configured to:
   regardless of whether the authentication is successful, transmit the log image as the overview image data based on the print job via the communication network interface device.

8. The image processing apparatus according to claim 1, wherein the processor is further configured to:
   when determining to interrupt transmission of the overview image data to the external device, determine whether an instruction to interrupt the print job in execution is received; and
   when determining that the instruction to interrupt the print job in execution is received, interrupt the print job in execution.

9. The image processing apparatus according to claim 1, wherein the processor is further configured to:
   when determining to transmit the overview image data to the external device, generate print data to be used for the print, based on the print job; and
   when determining that the authentication is successful, cause the print engine to perform the print using the generated print data.

10. The image processing apparatus according to claim 1, wherein the processor is further configured to:
    when determining that the authentication is successful, generate print data to be used for the print, based on the print job, and cause the print engine to perform the print using the generated print data.

11. The image processing apparatus according to claim 1, further comprising a user operated interface device,
    wherein the processor is further configured to:
       receive, via the user opeated interface device, the authentication information associated with the print job;
       perform the authentication to determine whether the received authentication information is coincident with authentication data registered in the memory; and
    when the received authentication information is coincident with authentication data registered in the memory, determine that the authentication is successful.

12. The image processing apparatus according to claim 1, the processor is coupled to a non-transitory computer-readable medium storing computer-readable instructions that are executable by the processor to:
    receive the print job via the communication network interface device;
    acquire the authentication information associated with the print job;
    perform the authentication based on the acquired authentication information;
    determine whether the authentication is successful;
    when determining that the authentication is successful, cause the print engine to perform the print based on the print job; and regardless of whether the authentication is successful, transmit the overview image data based on the print job via the communication network interface device.

13. A method implementable on a processor coupled with an image processing apparatus comprising a print engine, a communication network interface device, and a memory, the method comprising:
receiving a print job via the communication network interface device;
storing the received print job into the memory; and
based on the print job stored in the memory, performing a plurality of output processes comprising:
a first output process comprising:
acquiring authentication information associated with the print job;
performing authentication based on the acquired authentication information, and determining whether the authentication is successful;
when determining that the authentication is successful, causing the print engine to print an image on a sheet based on the print job; and
a second output process comprising:
prior to performing the authentication, generating overview image data based on the print job and transmitting the generated overview image data via the communication network interface device, the overview image data representing a log image as an overview image of the image to be formed based on the print job.

14. The method according to claim 13, further comprising:
transmitting a deletion request to the external device via the communication network interface device in the particular transmission method when determining to delete the overview image data transmitted to the external device.

15. The method according to claim 13, further comprising:
when determining that the authentication is successful, causing the print engine to print an image based on the print job, and transmitting specific image data based on the print job via at least one of facsimile communication and an e-mail.

16. The method according to claim 14, further comprising:
when determining to interrupt the print job, transmitting the deletion request to the external device via the communication network interface device to delete the overview image data.

17. A non-transitory computer-readable medium storing computer-readable instructions that are executable by a processor coupled with an image processing apparatus comprising a print engine, a communication network interface device, and a memory, the instructions being configured to, when executed by the processor, cause the image processing apparatus to:
receive a print job via the communication network interface device;
store the received print job into the memory; and
based on the print job stored in the memory, perform a plurality of output processes comprising:
a first output process comprising:
acquiring authentication information associated with the print job;
performing authentication based on the acquired authentication information, and determining whether the authentication is successful;
when determining that the authentication is successful, causing the print engine to print an image on a sheet based on the print job; and
a second output process comprising:
prior to performing the authentication, generating overview image data based on the print job and transmitting the generated overview image data based on the print job via the communication network interface device, the overview image data representing a log image as an overview image of the image to be formed based on the print job.

18. The non-transitory computer-readable medium according to claim 17,
wherein the instructions are further configured to, when executed by the processor, cause the image processing apparatus to:
transmit a deletion request to the external device via the communication network interface device in the particular transmission method when determining to delete the overview image data transmitted to the external device.

19. The non-transitory computer-readable medium according to claim 17,
wherein the instructions are further configured to, when executed by the processor, cause the image processing apparatus to:
when determining that the authentication is successful, cause the print engine to print an image based on the print job, and transmit specific image data based on the print job via at least one of facsimile communication and an e-mail.

20. The non-transitory computer-readable medium according to claim 18,
wherein the instructions are further configured to, when executed by the processor, cause the image processing apparatus to:
when determining to interrupt the print job, transmit the deletion request to the external device via the communication network interface device to delete the overview image data.

* * * * *

UNITED STATES PATENT AND TRADEMARK OFFICE
CERTIFICATE OF CORRECTION

PATENT NO. : 10,970,015 B2
APPLICATION NO. : 16/448382
DATED : April 6, 2021
INVENTOR(S) : Yuichiro Sakuragi Page 1 of 1

It is certified that error appears in the above-identified patent and that said Letters Patent is hereby corrected as shown below:

In the Claims

Column 23, Claim 2, Line 46 should read:
communication network interface device in a par- Column 25, Claim 14, Line 34 should read:
the communication network interface device in a Column 26, Claim 18, Line 31 should read:
communication network interface device in a par- Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*